(12) United States Patent
McCoy et al.

(10) Patent No.: US 12,311,890 B2
(45) Date of Patent: May 27, 2025

(54) ENCASEMENT PROTECTIVE APPARATUS

(71) Applicants: Earl McCoy, Colorado Springs, CO (US); Audrey McCoy, Colorado Springs, CO (US)

(72) Inventors: Earl McCoy, Colorado Springs, CO (US); Audrey McCoy, Colorado Springs, CO (US)

( * ) Notice: Subject to any disclaimer, the term of this patent is extended or adjusted under 35 U.S.C. 154(b) by 153 days.

(21) Appl. No.: 18/118,592

(22) Filed: Mar. 7, 2023

(65) Prior Publication Data
US 2023/0286446 A1 Sep. 14, 2023

Related U.S. Application Data

(60) Provisional application No. 63/317,544, filed on Mar. 8, 2022.

(51) Int. Cl.
*B60R 9/08* (2006.01)
*B60R 9/058* (2006.01)

(52) U.S. Cl.
CPC ............... *B60R 9/08* (2013.01); *B60R 9/058* (2013.01)

(58) Field of Classification Search
CPC ....................................................... B60R 9/058
See application file for complete search history.

(56) References Cited

U.S. PATENT DOCUMENTS

| | | | | |
|---|---|---|---|---|
| 8,875,963 B2 * | 11/2014 | Knutson | ................ | A01K 97/08 |
| | | | | 224/922 |
| 10,542,738 B2 * | 1/2020 | Moses | .................. | A47F 7/0035 |
| 11,325,539 B2 * | 5/2022 | Sagen | ..................... | A01K 97/08 |
| 11,370,363 B2 * | 6/2022 | McFadden | ............... | B60R 9/08 |
| 2006/0237501 A1 * | 10/2006 | Gonzalez | ............... | A01K 97/08 |
| | | | | 224/325 |
| 2011/0232339 A1 * | 9/2011 | Norman | ................. | A01K 97/08 |
| | | | | 70/159 |
| 2017/0036614 A1 * | 2/2017 | Rahman | .................. | B60R 9/058 |
| 2019/0054862 A1 * | 2/2019 | McCoy | .................. | B60R 9/055 |
| 2019/0110456 A1 * | 4/2019 | Smigaj | .................. | A01K 97/08 |
| 2019/0230911 A1 * | 8/2019 | Smigaj | ..................... | B60R 9/08 |
| 2020/0085027 A1 * | 3/2020 | Crawford | ............... | A01K 97/08 |

* cited by examiner

*Primary Examiner* — Brian D Nash
(74) *Attorney, Agent, or Firm* — Roger A. Jackson

(57) ABSTRACT

An encasement protective apparatus for enveloping an article, the article having a lengthwise axis, the apparatus including a substantially rigid partial surrounding sidewall about a longitudinal axis, wherein the partial surrounding sidewall has a first end portion and an opposing second end portion wherein the longitudinal axis spanning therebetween, the surrounding sidewall also having an outer surface portion and an opposing inner surface portion, thereby the inner surface portion defining an interior, an aperture disposed therethrough the partial surrounding sidewall facilitating communication as between the interior and an external environment. Further included is a head element and a tail element wherein the tail element are disposed at opposite ends of the surrounding sidewall with a removably engageable cover element to substantially seal over the aperture, and a plurality of article holding finger extensions that are substantially parallel to one another disposed within the interior.

5 Claims, 19 Drawing Sheets

ENCASEMENT PROTECTIVE APPARATUS

RELATED PATENT APPLICATION

This application claims the benefit of U.S. provisional patent application Ser. No. 63/317,544 filed on Mar. 8, 2022 by Earl McCoy of Colorado Springs, Colorado, U.S. and Audrey McCoy of Colorado Springs, Colorado, U.S.

FIELD OF THE INVENTION

The present invention generally relates to protective covers and cases for articles. More particularly, the present invention discloses protective covers for skis, snowboards, and fishing poles, that are long and somewhat thin, however, with the ski and snowboard boots having bindings that have protrusions from the skis and snowboards needing to be accommodated in the protective case on a vehicle.

Further to the complication is the plurality of ski and snowboard bindings that extend roughly perpendicularly from a lengthwise axis of the ski or snowboard, these bindings can be fragile by their nature of being thin in construction and extending outward from the ski or snowboard in a cantilever fashion making the binding easily damaged. Thus, there is a challenge in protecting both the ski/snowboard and their respective protrusion shaped bindings. Further on fishing poles there is the reel protrusion that can be fragile in addition to the guides for the fish line that are also protrusions that can be somewhat fragile.

DESCRIPTION OF THE RELATED ART

Up until now there have been relatively moderate efforts in designing and manufacturing a fully engineered hard protective cover for skis, snowboards, and fishing poles, as a number of the current protective covers available for skis, snowboards, and fishing poles, available to the consumer appear to be design afterthoughts in that they are nothing any more special than a soft typical fabric cover, or having plastic shell construction. The typical protective cover has a zippered enclosure with a soft foam padded lining with a nylon type fabric cover, wherein the protective cover loosely fits around the ski, snowboard, or fishing pole. The current other protective cover materials available are typically various forms of corrugated cardboard, bubble wrap, or sheet foam padding that at the very best only moderately protect the ski, snowboard, or fishing pole, this being primarily due to the packaging and protective cover materials being inherently soft and flexible and also fitting haphazardly fitting around the uneven outer surface of the ski, snowboard, or fishing pole, including the bindings, reel, or guides, in a very loose manner, additionally due to the protective cover attempting to fit a wide variety of skis, snowboards, or fishing poles.

What this typically results in that the cover firstly will not have any structural rigidity to resist any sort of point impact to protect the ski, snowboard, or fishing pole, and secondly with the relative movement being allowed to the ski, snowboard, or fishing pole, within the cover during the normal vehicle movement inertia loads, the ski, snowboard, or fishing pole, will tend to bang around especially on its outer extended items like the bindings, reel, or guides, against the inside of the protective cover allowing potential further damage to the bindings this is especially critical in that this shifting of the ski, snowboard, or fishing pole, within the protective cover during transit is highly cyclical, i.e. occurring numerous times (in the thousands), thus the aforementioned damage can become cumulative in nature.

Therefore, two very basic desirable things come to light to maximize the shipping and transport protection given to the skis, snowboard, or fishing pole. The first desirable thing is "structural rigidity", in other words the protective cover should be able to handle a point load impact and be able to handle a bending load imposed upon the skis, snowboard, or fishing pole, along its longest axis from end to end. Wherein the aforementioned point load impact and bending load are placed upon the exterior of the protective cover, the protective cover would have the rigidity to absorb the brunt of this external loading by being its own rigid structure, thus not transmitting these external protective cover loads to the skis, snowboard, or fishing pole, itself. The second desirable thing for the protective cover is to have a very snug and close-fitting fit or support to the exterior surfaces of the skis and snowboard, that absolutely minimizes the relative movement of the skis, snowboard, or fishing pole, within the protective cover during transport or shipment. As this snug fitting concept will go a long way toward preventing the previously described high-frequency occurrence and cumulative damage to the exterior surfaces of the skis, snowboard, or fishing pole.

The well known problem to accomplishing the above two mentioned things for a protective cover typically requires a totally custom made hard shell enclosure that has an interior that is also custom fit to the external surface of the skis, snowboard, or fishing pole, as is typically used in specialized cases made for high value electronic equipment that is frequently shipped or transported frequently. To address one of these two things, the prior art in differing art areas has used air pressure to create temporary rigidity in structures, wherein as long as the air negative or positive pressure remains in place the normally flexible structure is rigid, with the structure becoming flexible once again when the air negative or positive pressure returns to atmospheric pressure. To address the close fitting requirement, the prior art has had solutions that are permanent, such as expandable polyurethane foam, that can certainly precisely encase an article's unique external shape for shipping without any relative movement of the article in the foam casing, however, the foam casing being permanent and not reusable, thus being acceptable for one time shipping from factory to user, however, not being acceptable for multiple transport scenarios, where the rod and reel is transported multiple times to its site of usage.

Another point is that while the skis or snowboard are inside the hard shell enclosure and being suspended or supported by resilient contacts, the bindings of both the skis and snowboard, along with the fishing rod reel and guides, should be suspended in free space so as not to risk damage to the bindings, reel, or guides, from any sort of contact with an interior surface of the hard shell enclosure.

Starting in the prior art for a semi rigid type case apparatus with U.S. Pat. No. 5,576,307 to Frydenberg disclosed is a sliding latch for a molded plastic container that has first and second portions which are relatively movable between open and closed configurations; and the two portions have first edges which are juxtaposed when the portions are closed. Further in Frydenberg a T-shaped rail is fixed to the first edge of one of the container portions, and the rail extends along the edge for a significant length-except for a location where it is interrupted by two adjacent gaps. In Frydenberg a pair of posts are fixed to the first edge of the second container portion, and the posts are positioned so as to be insertable into the two rail gaps when the two container portions are in their closed configuration. The posts in Frydenberg have a transverse configuration which matches the transverse configuration of the rail, so that the posts may be described as forming geometric extensions of the rail when the two container portions are closed. A slide in Frydenberg has an interiorly facing opening which is sized for engaging the rail and for being captured thereby, further the slide has a first position at which the pair of posts are free to move transversely with respect to the rail, such that the two container portions may be opened; and the slide has a second position at which it completely envelops the two posts and at least a portion of the rail. In its second position in Frydenberg the slide precludes opening of the container by virtue of preventing transverse movement of the posts with respect to the rail.

Continuing in the prior art for air rigid apparatus in U.S. Pat. No. 8,387,789 to Baker disclosed is a protective apparatus for an article, the apparatus including a surrounding sidewall having a first end portion and an opposing second end portion, the sidewall also having a perpendicularly oriented first margin portion and an opposing second margin portion, also with a primary interior. The interior in Baker includes a plurality of first and second chambers that are intersticed in position to one another, in addition, included is a plurality of particulate items loosely disposed within each of the first and second chambers and a structure for removable engagement positioned adjacent to the first and second margins. The removable engagement structure in Baker facilitates the first and second margins to be removably engaged allowing the surrounding sidewall to envelope the article, wherein the primary interior can be evacuated, thus removing the air spaces between the particulate items and in the interior resulting in rigidifying the surrounding sidewall, thus protecting the article.

What is needed is a protective case that accomplishes is two very basic desirable things to maximize the shipping and transport protection given to the skis, snowboard, or fishing pole. The first desirable thing is "structural rigidity", in other words the protective case must be able to handle a point load impact and be able to handle a bending load imposed upon the protective case and not transfer the bending load or the point load to the skis, snowboard, or fishing pole, along its longest axis from end to end. Wherein, the aforementioned point load impact and bending load are placed upon the exterior of the protective case, thus the protective case will absorb and stand up to the brunt of this external loading by being its own rigid structure, thus not transmitting these external protective cover loads to the skis, snowboard, or fishing pole, itself. The second desirable thing for the protective case is to have a very snug and close-fitting fit to the exterior surfaces of the skis, snowboard, or fishing pole, that's absolutely minimizes the relative movement of the skis, snowboard, or fishing pole, in the protective case during transport or shipment. As this snug fitting concept will go a long way toward preventing the previously described high-frequency occurrence and cumulative damage to the skis, snowboard, or fishing pole, plus further as mentioned before the bindings, reel, and guides, shall be freely suspended within the interior of the protective case to not have any contact with any surface thus saving the binding from any damage.

Therefore, the challenge of the present invention is to have a protective case apparatus that can custom fit itself to a multitude of different size skis, snowboards, or fishing poles, with their associated bindings, reel, or guides, plus to have the structural rigidity necessary to adequately protect the skis, snowboard, or fishing pole, with their associated bindings, reel, or guides, while at the same time having the ability to be used with a number of different sizes and types of vehicles to mount the protective case upon.

SUMMARY OF INVENTION

Broadly, the present invention is of an encasement protective apparatus for enveloping an article, the article having a lengthwise axis, the apparatus including a substantially rigid partial surrounding sidewall about a longitudinal axis, wherein the partial surrounding sidewall has a first end portion and an opposing second end portion wherein the longitudinal axis spanning therebetween, the surrounding sidewall also having an outer surface portion and an opposing inner surface portion, thereby the inner surface portion defining an interior, an aperture disposed therethrough the partial surrounding sidewall facilitating communication as between the interior and an external environment.

Further included in the encasement protective apparatus is a head element having an outermost surface and an opposing innermost surface wherein the head element is affixed to the first end portion such that structurally the outer surface portion extends to the outmost surface and the inner surface portion extends to the innermost surface. Also included in the encasement protective apparatus is a tail element wherein the tail element is positioned opposite of the head element in relation to the surrounding sidewall, the tail element having an exterior surface and an internal surface, such that the tail element is affixed to the second end portion such that structurally the outer surface portion extends to the exterior surface and the inner surface portion extends to the internal surface.

In addition, included in the encasement protective apparatus is a removably engageable cover element that has an interface to substantially seal over the aperture to facilitate the interior being substantially isolated from the external environment, and a plurality of finger extensions that are substantially parallel to one another, each finger extension having a proximal end portion and an opposing distal end portion, each proximal end portion extending from the inner surface portion, wherein the plurality of finger extensions form a gap as between one another that removably engages the article such that the article lengthwise axis and the longitudinal axis are substantially parallel to one another, wherein operationally the article is secured within the interior and protected from the external environment by the encasement protective apparatus.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 7 shows cross section 7-7 from FIG. 2, wherein FIG. 7 shows a pair of the plurality of finger extensions that includes a core and a resilient material encapsulation of the core, that both extend from the substantially rigid partial surrounding sidewall, further shown is a gap as between each of the plurality of finger extensions that are positioned in a substantially parallel position to one another;

FIG. 8 shows cross section 8-8 from FIG. 3, wherein FIG. 8 shows a pair of finger extensions in use that includes the core and the resilient material encapsulation of the core, that both extend from the substantially rigid partial surrounding sidewall, further shown is the gap as between each of the plurality of finger extensions that are positioned in the substantially parallel position to one another, wherein the pair of articles, for instance the pair of skis compressed toward one another via the resilient material encapsulation of the core that is compressed to hold and support the pair of skis to one another;

FIG. 9 shows cross section 9-9 from FIG. 4, wherein FIG. 9 shows a pair of the plurality of finger extensions in use that includes the core and the resilient material encapsulation of the core, that both extend from the substantially rigid partial surrounding sidewall, further shown is the gap as between each of the plurality of finger extensions that are positioned in the substantially parallel position to one another, wherein the article, for instance the snowboard is compressed via the resilient material encapsulation of the core that is compressed to hold and support the snowboard;

FIG. 10 shows view 10-10 from FIG. 12, wherein FIG. 10 shows a vehicle roof rail that is used to mount the encasement protective apparatus to the vehicle via a means for removable engagement as between the vehicle roof rail and the substantially rigid partial surrounding sidewall of the encasement protective apparatus;

REFERENCE NUMBERS IN DRAWINGS

Figure 1:
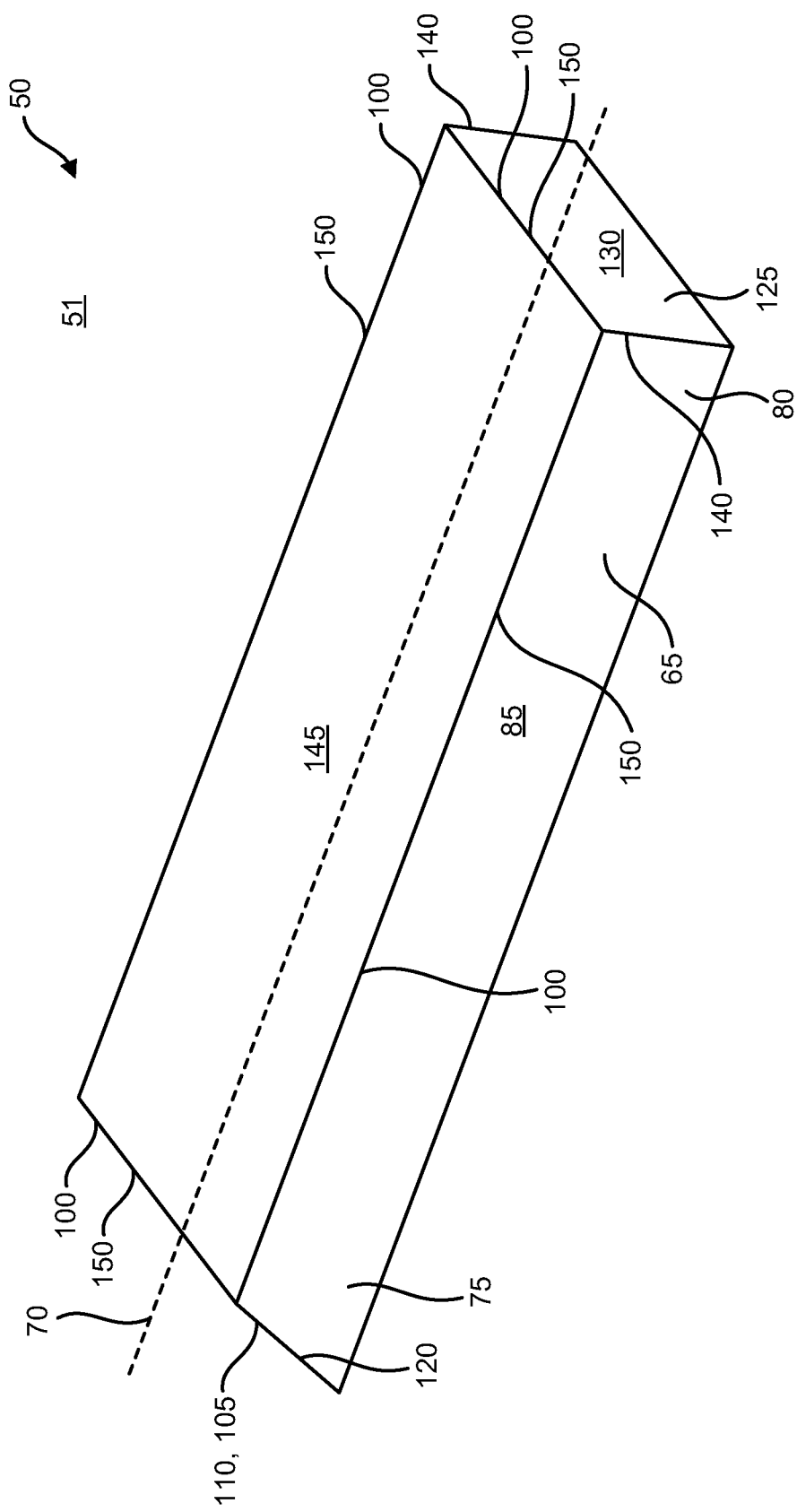
FIG. 1 shows an upper perspective view of the encasement protective apparatus showing a rigid surrounding sidewall with a head element and a tail element, plus a cover element in a closed state over an aperture.

50 Encasement protective apparatus
51 External environment
52 Vehicle
53 Vehicle roof with roof rail
55 Article that can be in the form of a pair of snow skis, or a snowboard, or a fishing pole
56 Reel end portion of the fishing pole 55
57 Guide tip portion of the fishing pole 55
60 Lengthwise axis of the article 55
65 Substantially rigid partial surrounding sidewall
70 Longitudinal axis of the substantially rigid partial surrounding sidewall 65
75 First end portion of the substantially rigid partial surrounding sidewall 65
80 Second end portion of the substantially rigid partial surrounding sidewall 65
85 Outer surface portion of the substantially rigid partial surrounding sidewall 65
90 Inner surface portion of the substantially rigid partial surrounding sidewall 65
95 Interior of the substantially rigid partial surrounding sidewall 65
100 Aperture disposed therethrough the partial surrounding sidewall 65 to facilitate communication as between the interior 95 and the external environment 51
105 Head element
110 Outermost surface of the head element 105
115 Innermost surface of the head element 105
120 Affixed nature of the head element 105 to the first end portion 75 such that structurally the outer surface portion 85 extends to the outmost surface 110 and the inner surface portion 90 extends to the innermost surface 115
125 Tail element wherein the tail element 125 is positioned opposite of 105 head element in relation to the surrounding sidewall 65
130 Exterior surface of the tail element 125
135 Internal surface of the tail element 125
140 Affixed nature of the tail element 125 to the second end portion 80 such that structurally the outer surface portion 85 extends to the exterior surface 130 and the inner surface portion 90 extends to the internal surface 135
145 Removably engageable cover element
150 Interface of the cover element 145 to substantially seal over the aperture 100 to facilitate the interior 95 being substantially isolated from the external environment 51
155 Plurality of finger extensions
160 Substantially parallel position and distance of the plurality of finger extensions 155 to one another which can also be the substantially parallel position 160 and distance of the first 310, second 345, third 370, and fourth 410 gaps respectively to one another
165 Proximal end portion of a finger extension 155
170 Distal end portion of the finger extension 155
175 Extending of each proximal end portion 165 from the inner surface portion 90
180 Gap formed between the finger extensions 155
185 Removably engaging the article 55 to the gap 180
190 Substantially parallel position between the article lengthwise axis 60 and the partial surrounding sidewall longitudinal axis 70
195 Means for removable engagement to the vehicle roof rail 53, wherein the means 195 for removable engagement to the vehicle roof rail 53 is affixed to the outer surface portion 85, to operationally facilitate transport of the encasement protective apparatus 50 via the vehicle 52.
200 Core of a substantially rigid material of the finger 155
205 Encapsuled with a resilient material for the finger 155 to provide a cushion to suspend and substantially secure the article 55
300 High density foam rubber for the plurality of finger extensions 155
305 Plurality of finger extensions 155 sized and configured to receive the fishing pole 55 reel end portion 56
310 First gap of the plurality of finger extensions 305
315 Narrow portion of the first gap 310
320 Expanded portion of the first gap 310
325 Receiving of the reel end portion 56 into the expanded portion 320
330 Retaining of the reel end portion 56 via the narrow portion 315
335 Primary fishing pole reel end portion 56 holder
340 Secondary fishing pole guide tip portion 57 holder
345 Second gap of the secondary fishing guide tip portion 57 holder 340
350 Narrow slit of the second gap 345
355 Supporting of the fishing pole guide tip portion 57 into the narrow slit 350
360 Co-incident positioning of the narrow slit 350 and the expanded portion 320 to one another along the article 55 lengthwise axis 60 that is parallel to the longitudinal axis 70
365 Plurality of finger extensions 155 sized and configured to receive a pair of snow skis 55 that are facing one another
370 Third gap of the plurality of finger extensions 365
375 Initial depth of the third gap 370
380 Open end of the third gap 370
385 Root of the third gap 370
390 Flush position of the third gap open end 380 with the snow skis 55
395 Progressively increasing third gap 370 depth 375
400 Increasing of the third gap 370 depth being an increased depth equal to or greater than the initial depth 375 of the third gap 370
405 Clearance of adjacent ski boot bindings protrusions to be vertically offset to one another via the progressively increasing 395 third gap 370 depths 375, 400
410 Forth gap
415 Depth of the fourth gap 410
420 Open end of the fourth gap 410
425 Root of the fourth gap 410
430 Flush position of the fourth gap 410 open end 420 with the snowboard 55

DETAILED DESCRIPTION

Looking at FIG. 1 shows an upper perspective view of the encasement protective apparatus 50 showing a rigid surrounding sidewall 65 with a head element 105 and a tail element 125, plus a cover element 145 in a closed state over an aperture 100. Next, FIG. 2 shows an upper perspective view of the encasement protective apparatus 50 showing the rigid surrounding sidewall 65 with the head element 105 and the tail 125 element, plus the cover element 145 in an open state over the aperture 100 that shows a plurality of finger extensions 155 disposed within an interior 95 of the rigid surrounding sidewall 65.

Figure 3:
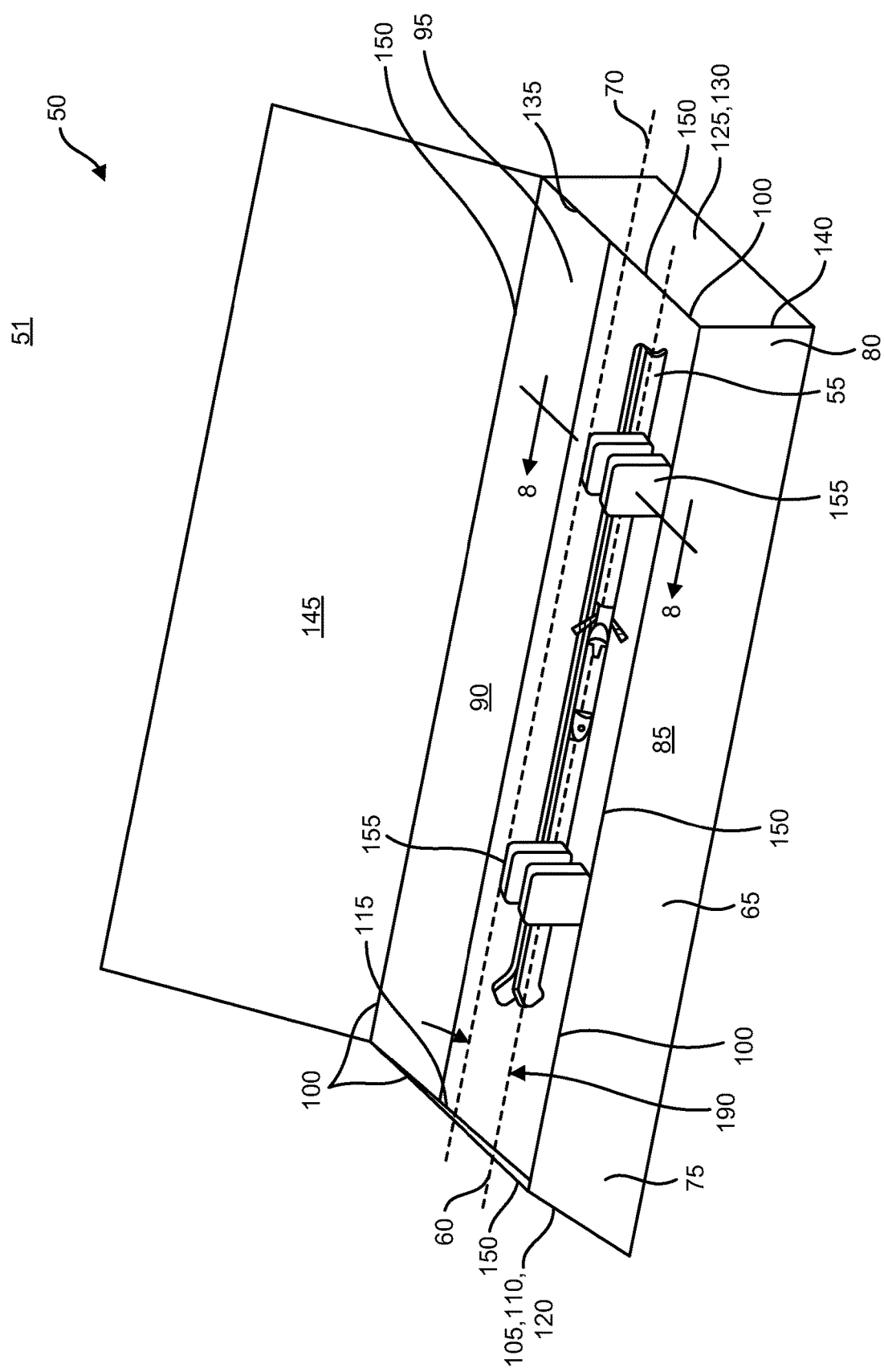
FIG. 3 shows an upper perspective view of the encasement protective apparatus showing the rigid surrounding sidewall with the head element and the tail element, plus the cover element in an open state over the aperture that shows a plurality of finger extensions disposed within an interior of the rigid surrounding sidewall, wherein the plurality of finger extensions are supporting the article in the form of skis.
Figure 4:
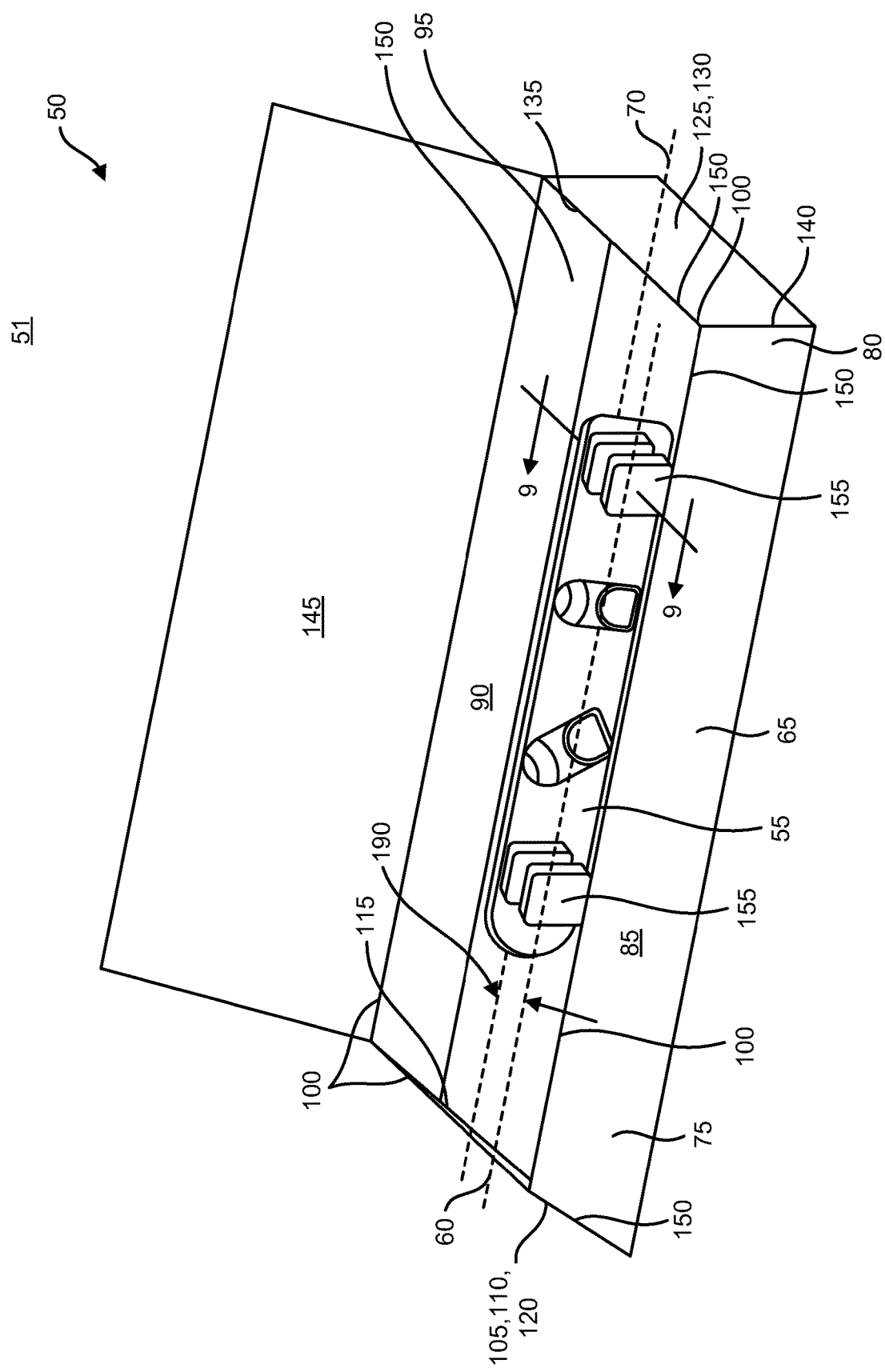
FIG. 4 shows an upper perspective view of the encasement protective apparatus showing the rigid surrounding sidewall with the head element and the tail element, plus the cover element in an open state over the aperture that shows a plurality of finger extensions disposed within an interior of the rigid surrounding sidewall, wherein the plurality of finger extensions are supporting the article in the form of a snowboard.

Continuing, FIG. 3 shows an upper perspective view of the encasement protective apparatus 50 showing the rigid surrounding sidewall 65 with the head element 105 and the tail element 125, plus the cover element 145 in an open state over the aperture 100 that shows the plurality of finger extensions 155 disposed within the interior 95 of the rigid surrounding sidewall 65, wherein the plurality of finger extensions 155 are supporting the article 55 in the form of a pair of skis. Next, FIG. 4 shows an upper perspective view of the encasement protective apparatus 50 showing the rigid surrounding sidewall 65 with the head element 105 and the tail element 125, plus the cover element 145 in an open state over the aperture 100 that shows the plurality of finger extensions 155 disposed within the interior 95 of the rigid surrounding sidewall 65, wherein the plurality of finger extensions 155 are supporting article 55 in the form of a snowboard.

Figure 5:
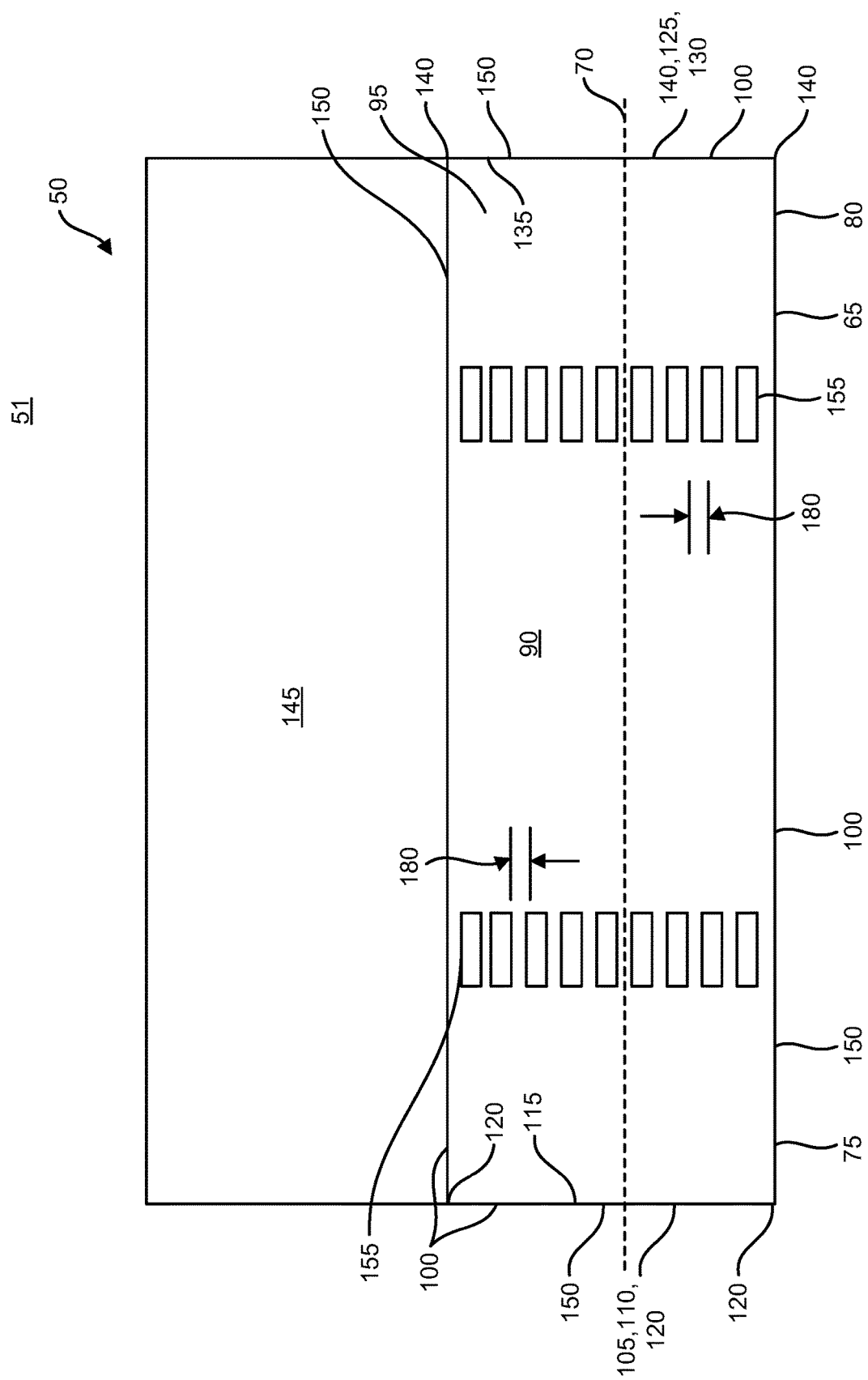
FIG. 5 shows a top view of the encasement protective apparatus showing the rigid surrounding sidewall with the head element and the tail element, plus the cover element in an open state over the aperture that shows a plurality of finger extensions disposed within an interior of the rigid surrounding sidewall.
Figure 6:
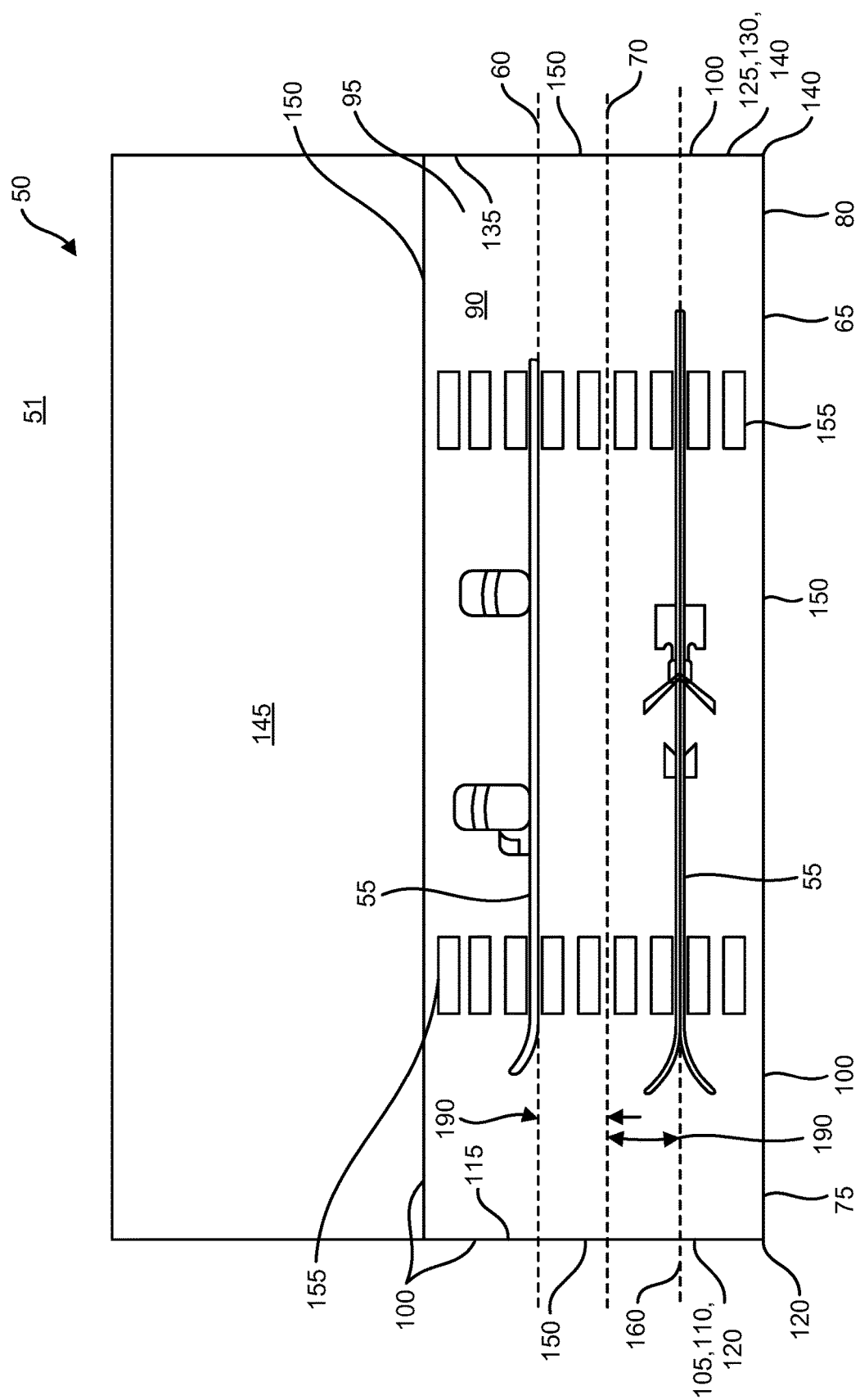
FIG. 6 shows a top view of the encasement protective apparatus showing the rigid surrounding sidewall with the head element and the tail element, plus the cover element in the open state over the aperture that shows the plurality of finger extensions disposed within the interior of the rigid surrounding sidewall, wherein the plurality of finger extensions are supporting the articles in the form of skis and a snowboard.

Further, FIG. 5 shows a top view of the encasement protective apparatus 50 showing the rigid surrounding sidewall 65 with the head element 105 and the tail element 125, plus the cover element 145 in an open state over the aperture 100 that shows the plurality of finger extensions 155 disposed within the interior 95 of the rigid surrounding sidewall 65. Next, FIG. 6 shows a top view of the encasement protective apparatus 50 showing the rigid surrounding sidewall 65 with the head element 105 and the tail element 125, plus the cover element 145 in an open state over the aperture 100 that shows the plurality of finger extensions 155 disposed within the interior 95 of the rigid surrounding sidewall 65, wherein the plurality of finger extensions 155 are supporting the article 55 in the form of a pair of skis and the snowboard.

Figure 2:
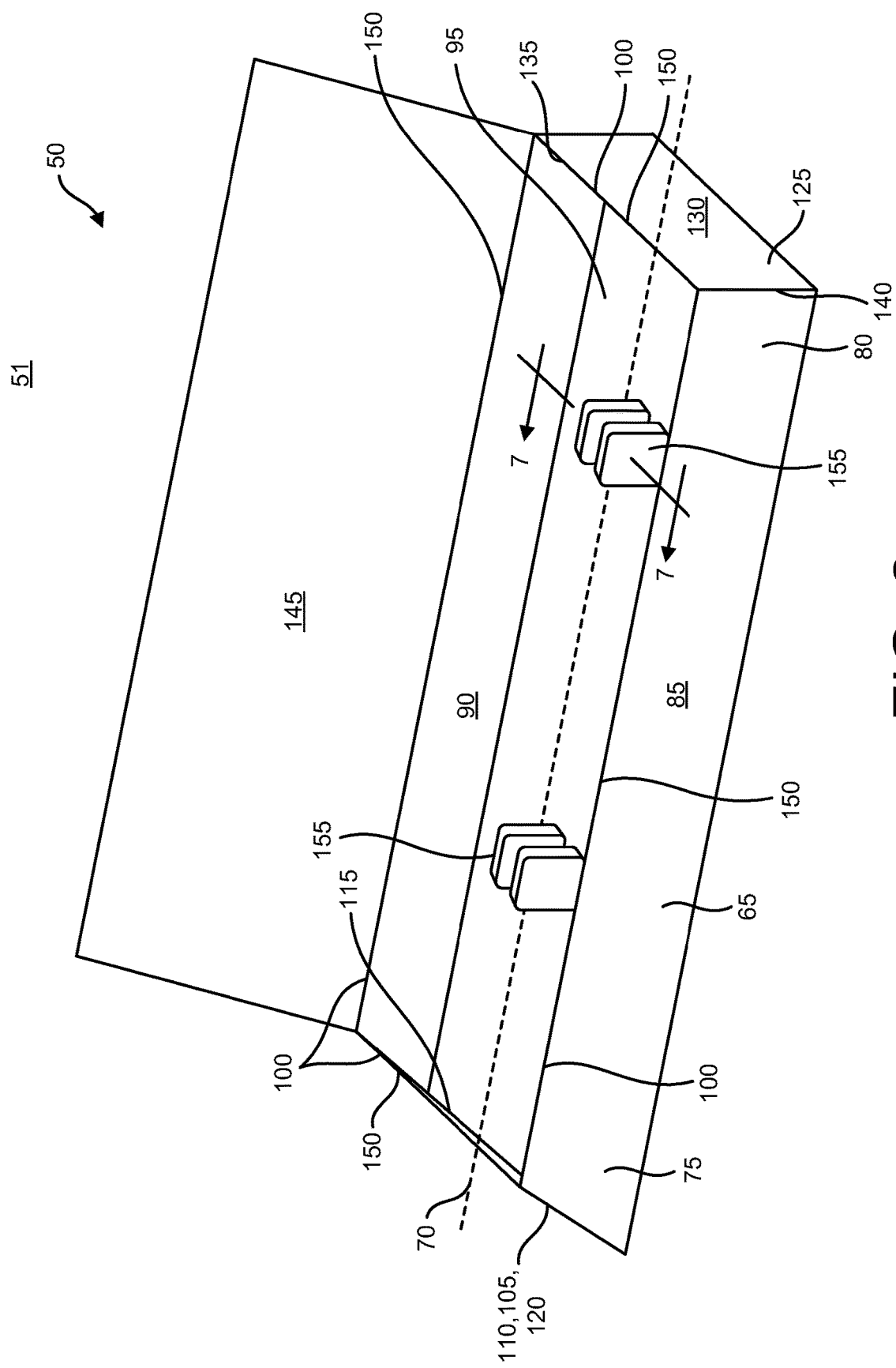
FIG. 2 shows an upper perspective view of the encasement protective apparatus showing the rigid surrounding sidewall with the head element and the tail element, plus the cover element in an open state over the aperture that shows a plurality of finger extensions disposed within an interior of the rigid surrounding sidewall.
Figure 7:
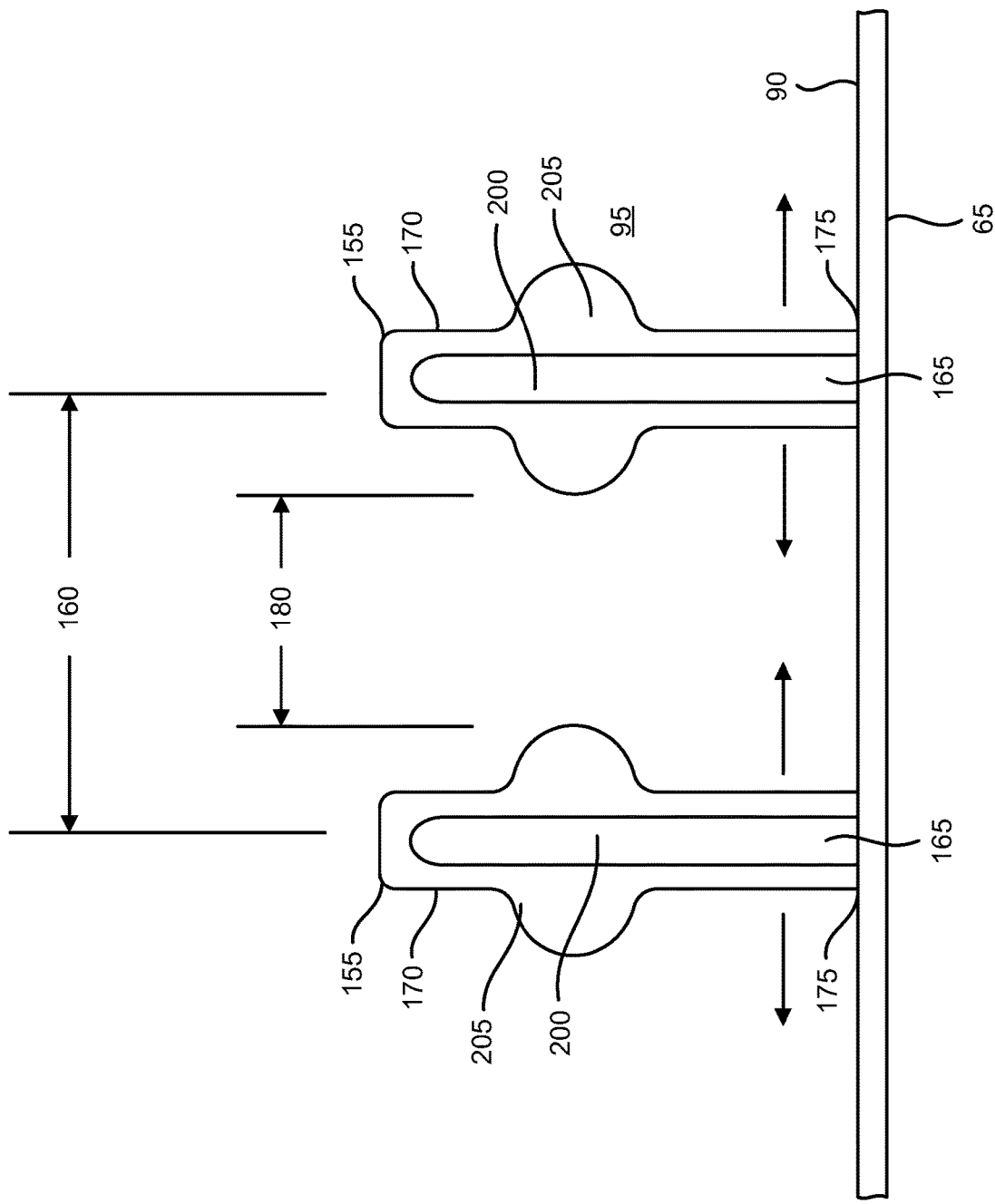

Continuing, FIG. 7 shows cross section 7-7 from FIG. 2, wherein FIG. 7 shows a pair of the plurality of finger extensions 155 that includes a core 200 and a resilient material encapsulation 205 of the core 200, that both extend from the substantially rigid partial surrounding sidewall 65, further shown is a gap 180 as between each of the plurality of finger extensions 155 that are positioned in a substantially parallel position 160 to one another.

Figure 8:
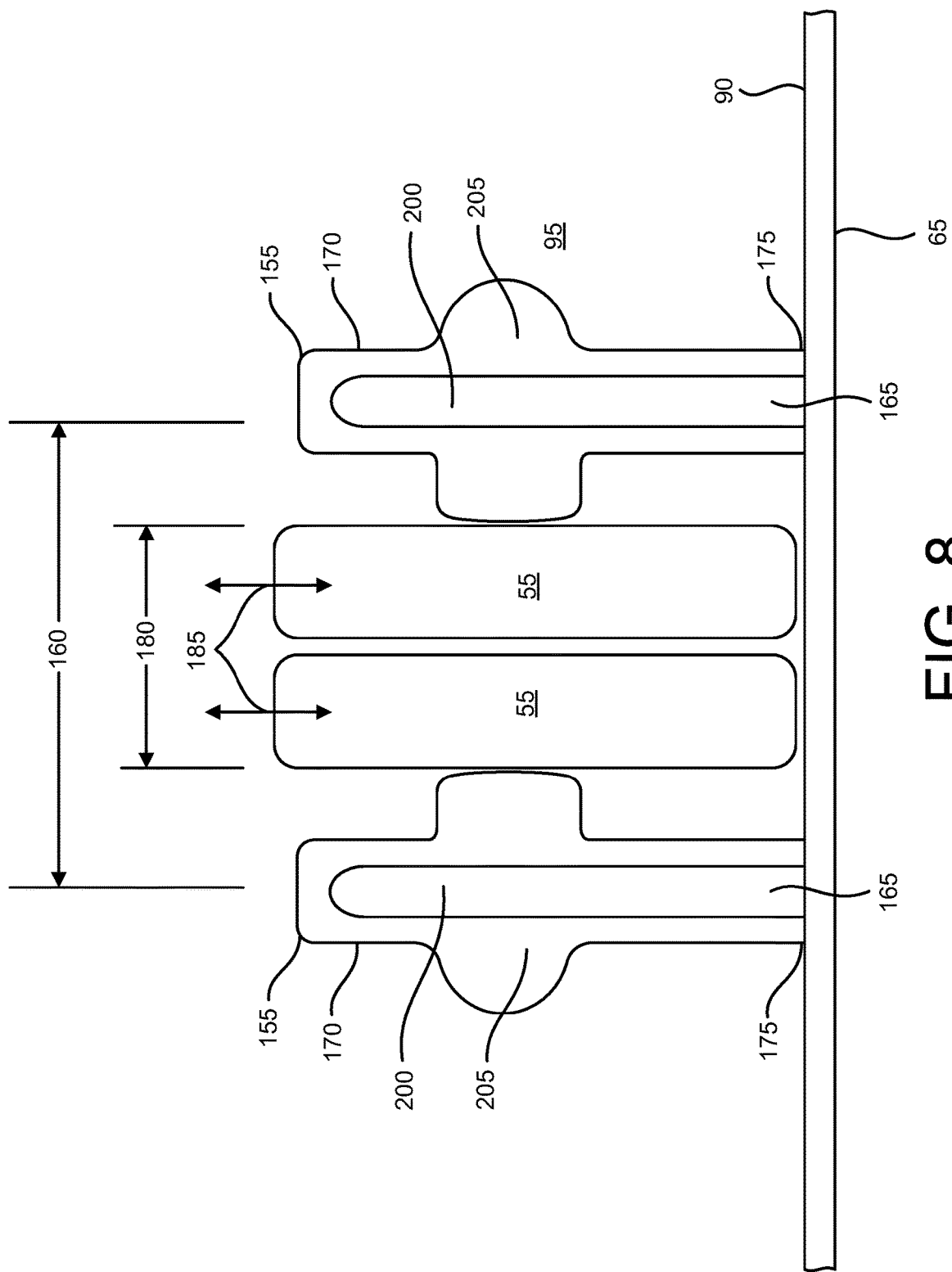

Moving onward, FIG. 8 shows cross section 8-8 from FIG. 3, wherein FIG. 8 shows the pair of finger extensions 155 in use that includes the core 200 and the resilient material encapsulation 205 of the core 200, that both extend from the substantially rigid partial surrounding sidewall 65, further shown is the gap 180 as between each of the plurality of finger extensions 155 that are positioned in the substantially parallel position 160 to one another, wherein the pair of articles 55, for instance the pair of skis are compressed toward one another via the resilient material encapsulation 205 of the core 200 that is compressed to hold and support the pair of skis to one another.

Figure 9:
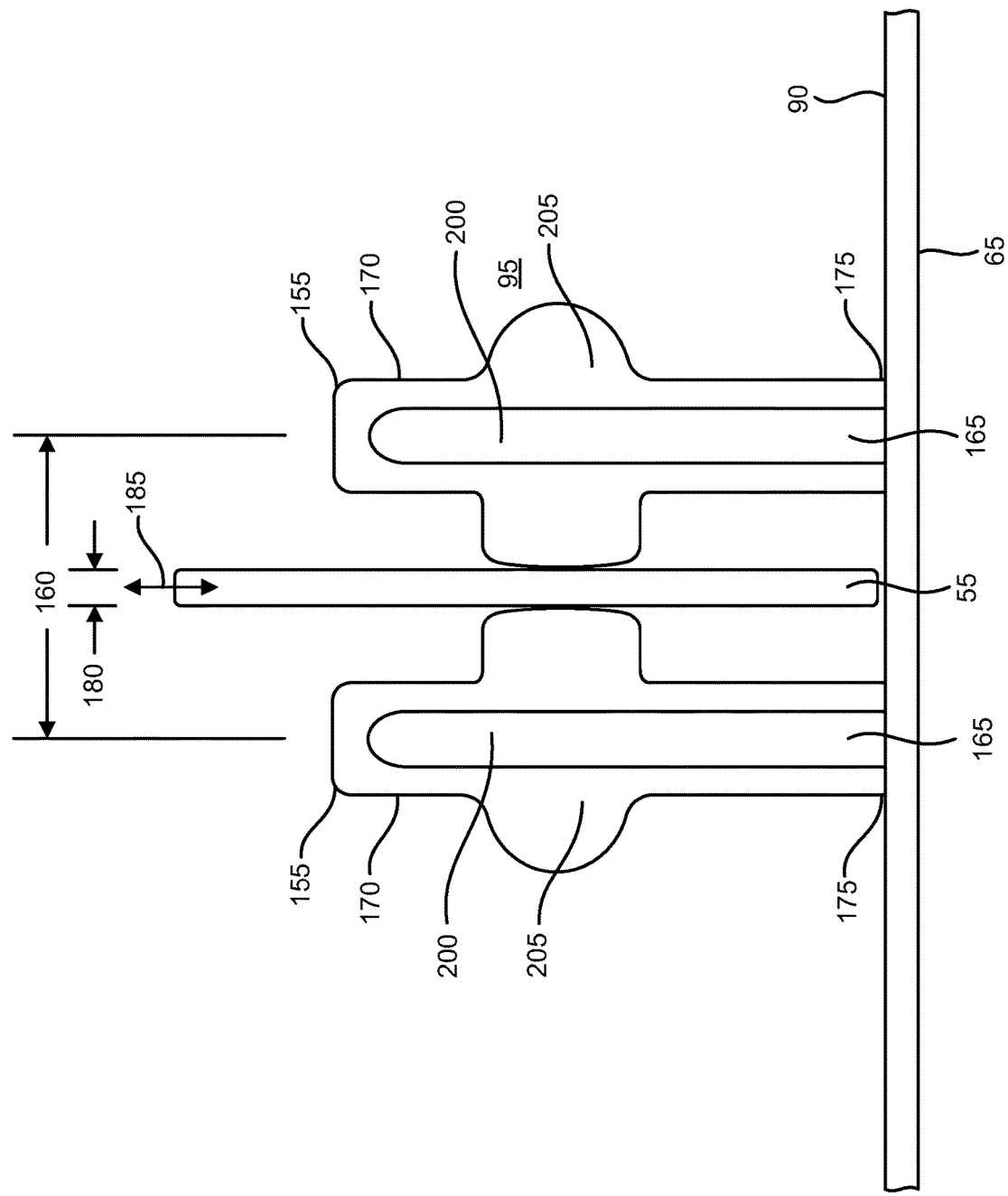

Next, FIG. 9 shows cross section 9-9 from FIG. 4, wherein FIG. 9 shows the pair of the plurality of finger extensions 155 in use that includes the core 200 and the resilient material encapsulation 205 of the core 200, that both extend from the substantially rigid partial surrounding sidewall 65, further shown is the gap 180 as between each of the plurality of finger extensions 155 that are positioned in the substantially parallel position 160 to one another, wherein the article 55, for instance the snowboard is compressed via the resilient material encapsulation 205 of the core 200 that is compressed to hold and support the snowboard.

Figure 10:
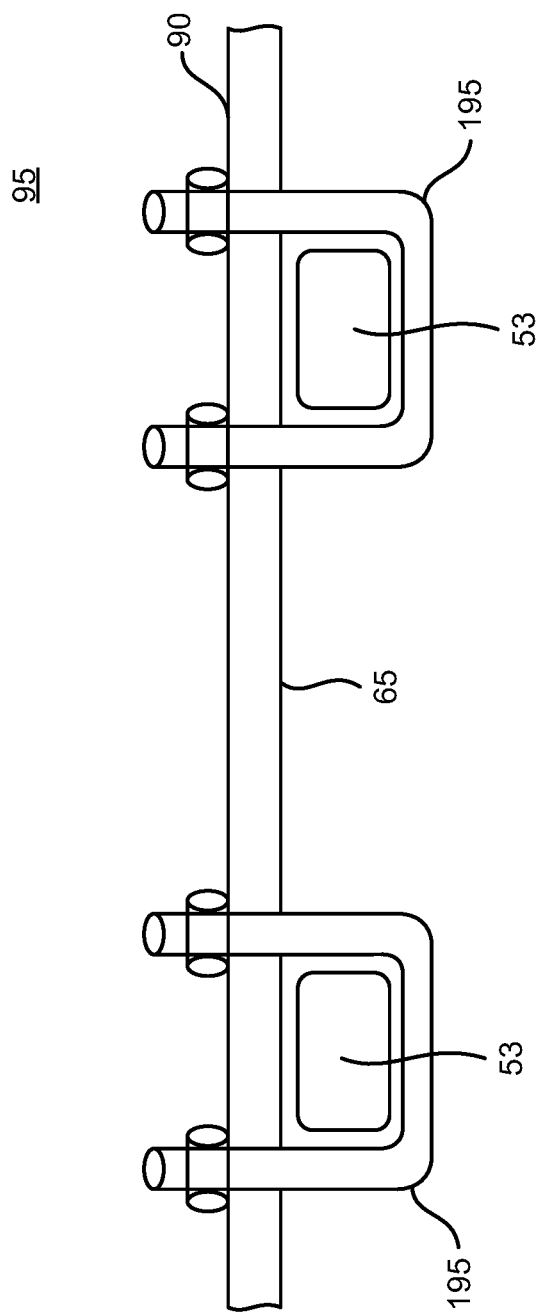
Figure 11:
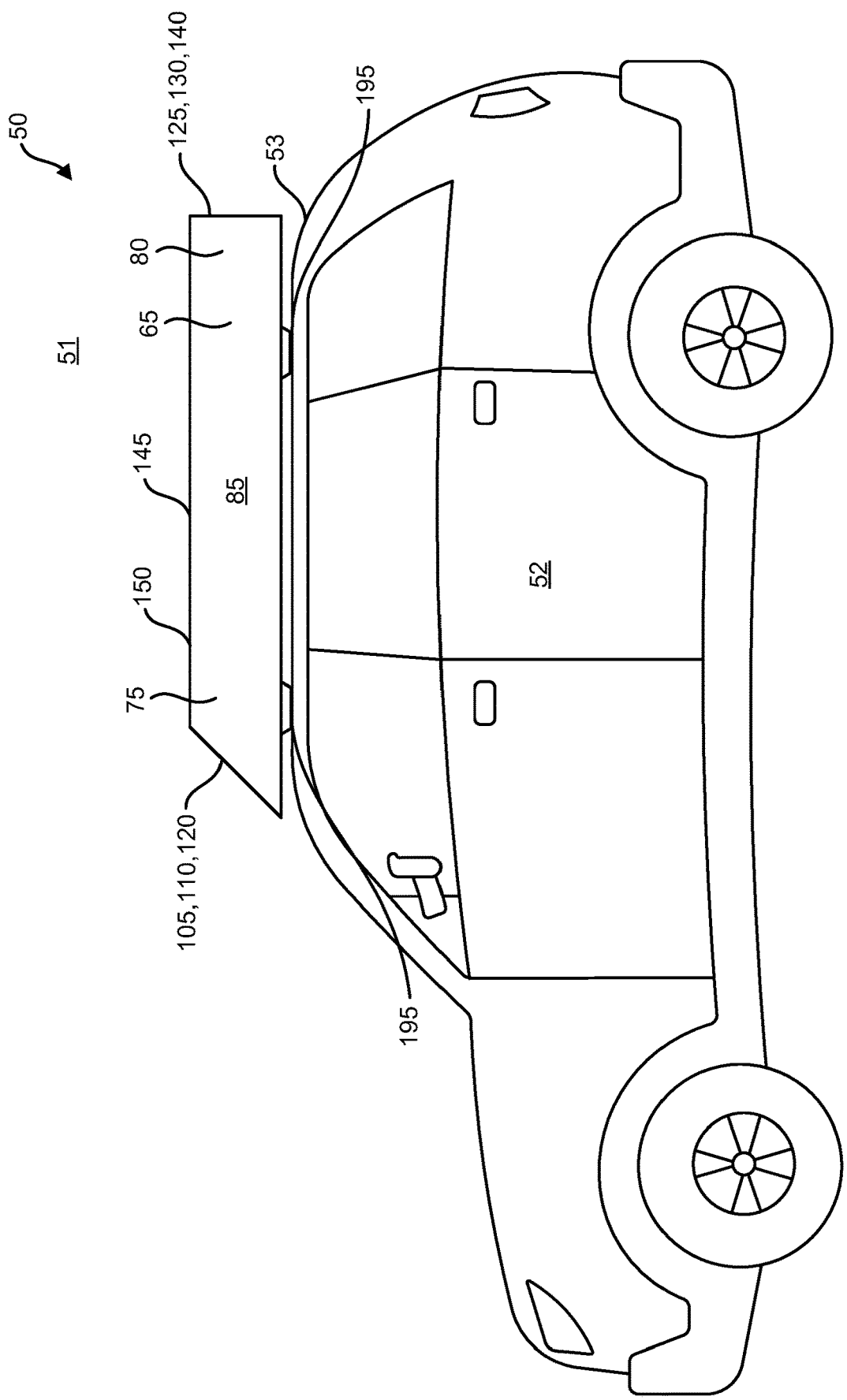
FIG. 11 is a side elevation view of the vehicle showing the position of the encasement protective apparatus in relation to the vehicle roof rails.
Figure 12:
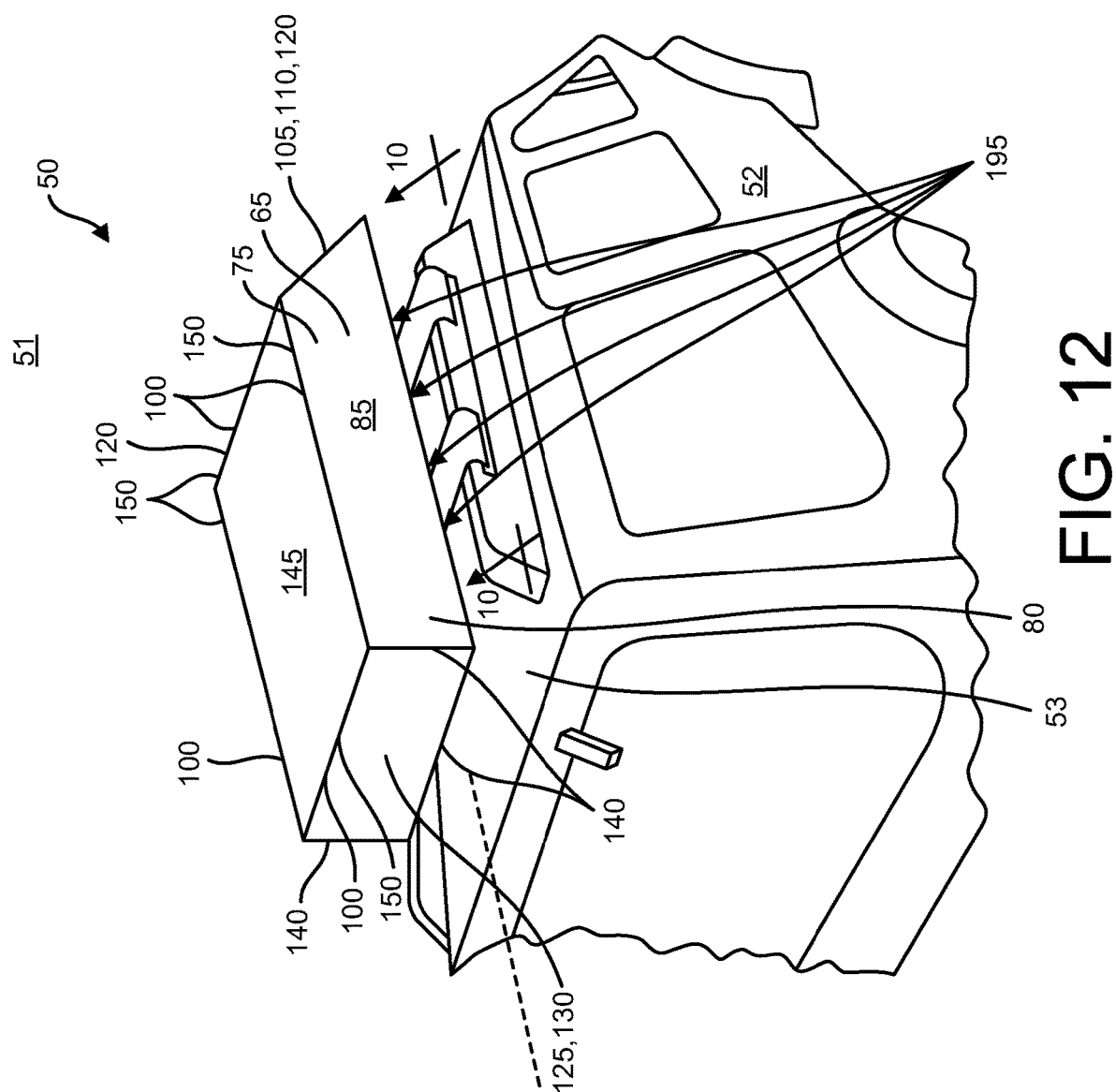
FIG. 12 shows an upper perspective view of the vehicle showing the position of the encasement protective apparatus in relation to the vehicle roof rails.

Continuing, FIG. 10 is view 10-10 from FIG. 12, wherein FIG. 10 shows a vehicle 52 roof rail 53 that is used to mount the encasement protective apparatus 50 to the vehicle 52 via a means for removable engagement 195 as between the vehicle 52 roof rail 53 and the substantially rigid partial surrounding sidewall 65 of the encasement protective apparatus 50. Further, FIG. 11 is a side elevation view of the vehicle 52 showing the position of the encasement protective apparatus 50 in relation to the vehicle 52 roof rails 53. Moving onward, FIG. 12 shows an upper perspective view of the vehicle 52 showing the position of the encasement protective apparatus 50 in relation to the vehicle 52 roof rails.

Figure 13:
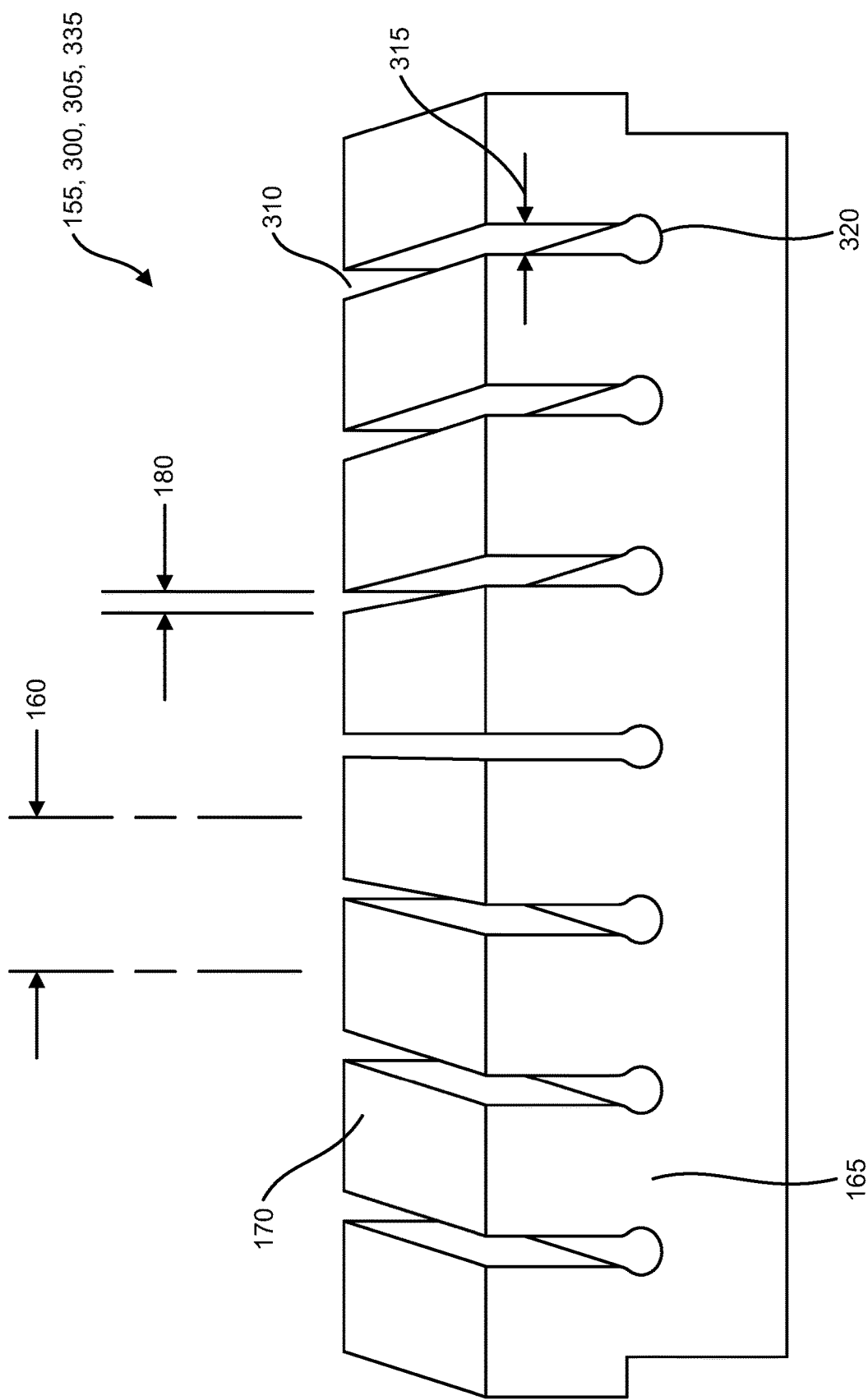
FIG. 13 shows an upper perspective view of the plurality of finger extensions optionally constructed from high density foam that includes the expanded portion and the narrow portion that are both sized and configured to receive and secure the article in the form of fishing pole with a reel end portion and a guide tip end portion.

Next, FIG. 13 shows an upper perspective view of the plurality of finger extensions 155 optionally constructed from high density foam 300 that includes the expanded portion 320 and the narrow portion 315 that are both sized and configured to receive and secure the article 55 in the form of fishing pole with a reel end portion 56 and a guide tip end portion 57.

Figure 14:
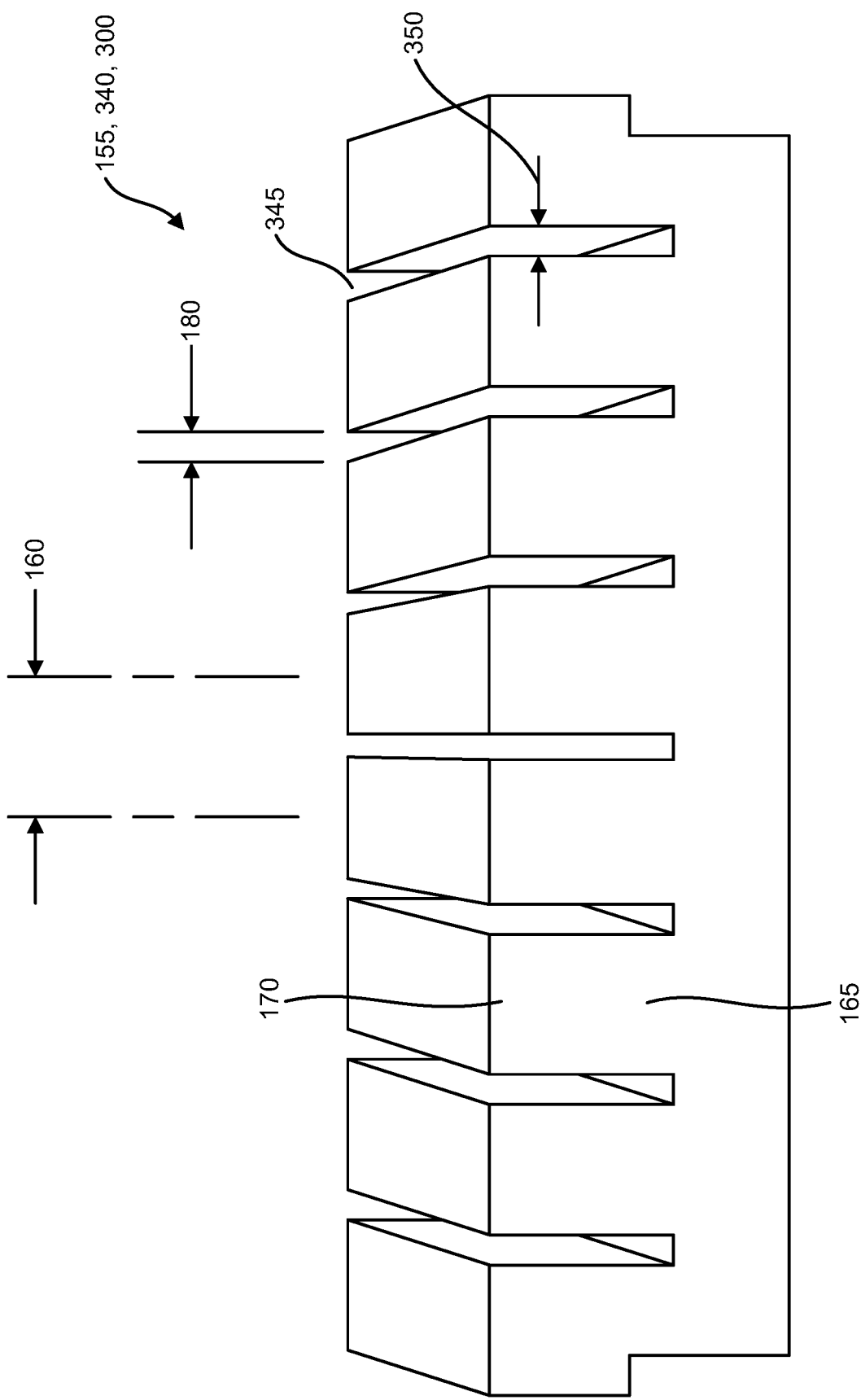
FIG. 14 shows an upper perspective view of the plurality of finger extensions optionally constructed from high density foam that includes the narrow slits that are sized and configured to receive and secure the article in the form of a snowboard.

Further, FIG. 14 shows an upper perspective view of the plurality of finger extensions 155 optionally constructed from high density foam 300 that includes the narrow slits 350 that are sized and configured to receive and secure the article 55 in the form of a snowboard or fishing pole guide tip portion 57.

Figure 15:
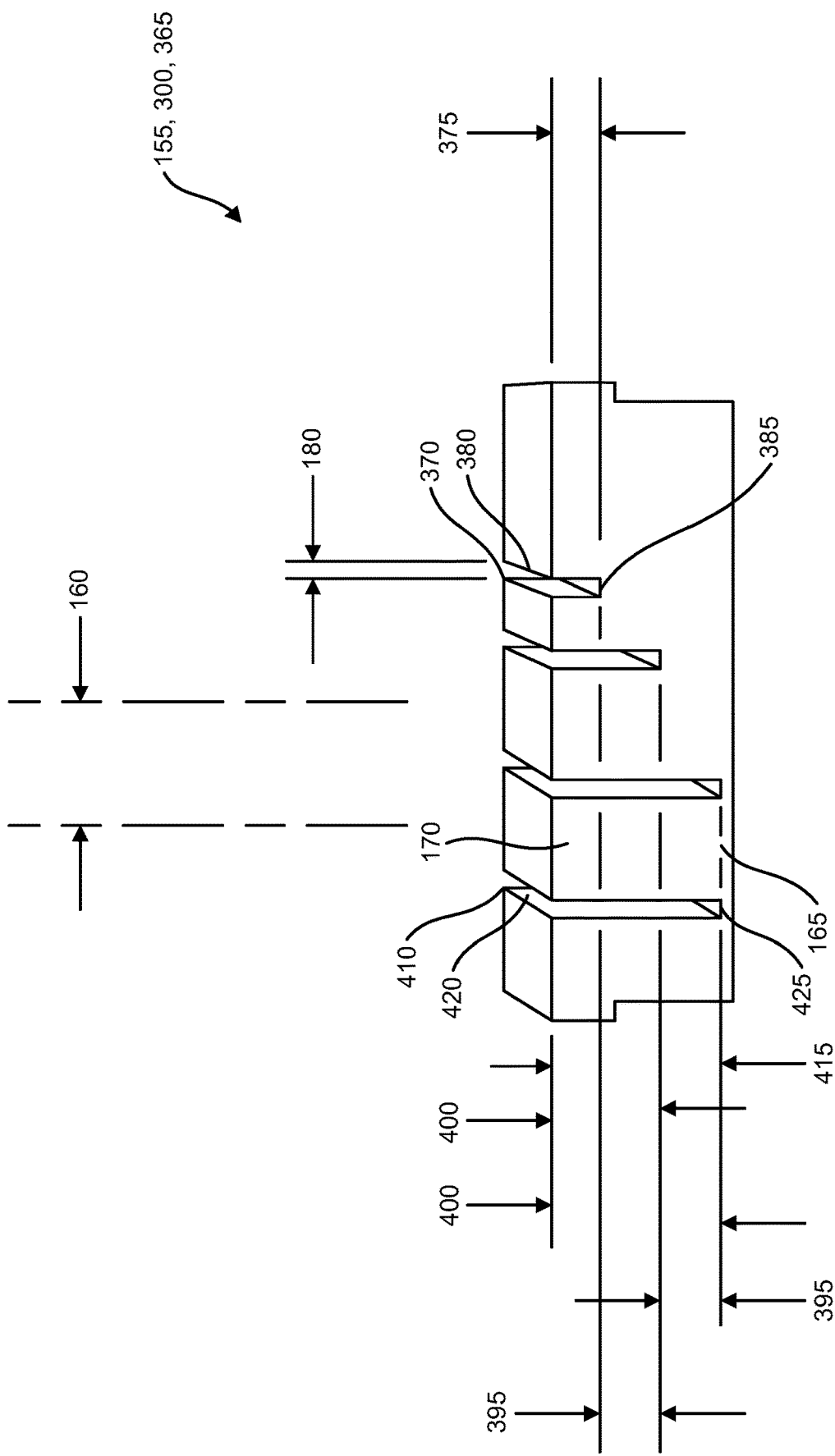
FIG. 15 shows an upper perspective view of the plurality of finger extensions optionally constructed from high density foam that includes the third gaps and depths of the third gaps that are sized and configured to receive and secure the article in the form of a pair of skis facing one another, noting that also shown is the progressively increasing third gap depth that accommodates the ski pairs to be offset from one another to allow the ski binding protrusions on each outer side of the ski pairs facing one another clearance space, thus allowing closer ski pair groups to be placed closer together.

Continuing, FIG. 15 shows an upper perspective view of the plurality of finger extensions 155 optionally constructed from high density foam 300 that includes the third gaps 370 and depths 375 of the third gaps 370 that are sized and configured to receive and secure the article 55 in the form of a pair of skis facing one another, noting that also shown is the progressively increasing 395 third gap 370 depth 375 that accommodates the ski pairs 55 to be offset 405 from one another to allow the ski binding protrusions on each outer side of the ski pairs 55 facing one another to have clearance space 405 on the ski binding protrusions, thus allowing closer ski pair 55 groups to be placed closer together through reduced parallel position distance 160 of the plurality of finger extensions 155 third gaps 370.

Figure 16:
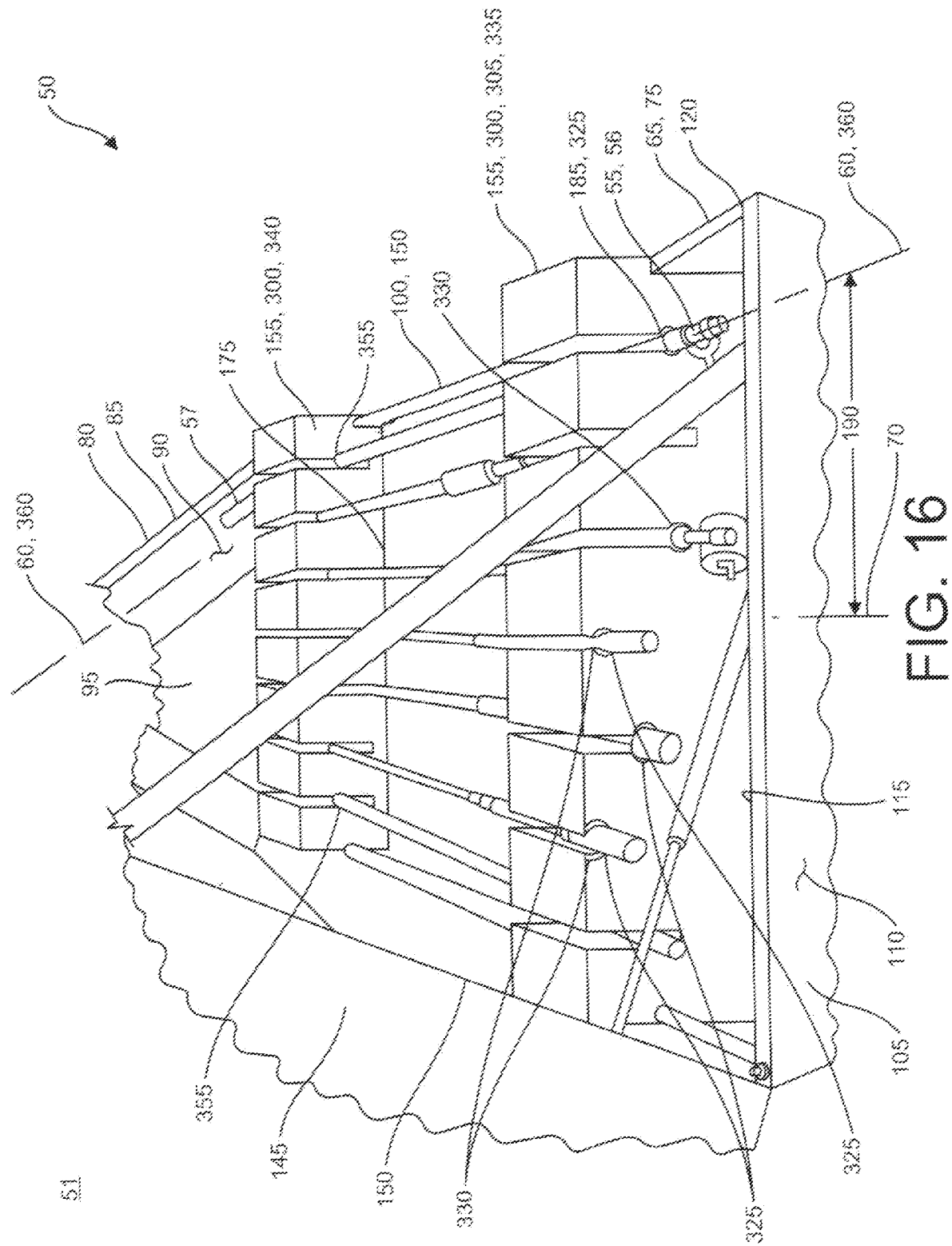
FIG. 16 shows an end upper perspective view of the encasement protective apparatus showing the rigid surrounding sidewall with the head element, plus the cover element in an open state over the aperture that shows the plurality of finger extensions disposed within an interior of the rigid surrounding sidewall, wherein the plurality of finger extensions are supporting the article in the form of a fishing pole with the reel end portion and the guide tip portion using the primary fishing pole reel end portion holder and the secondary fishing pole guide tip portion holder respectively.

Continuing, FIG. 16 shows an end upper perspective view of the encasement protective apparatus 50 showing the rigid surrounding sidewall 65 with the head element 105, plus the cover element 145 in an open state over the aperture 100 that shows the plurality of finger extensions 155 disposed within the interior 95 of the rigid surrounding sidewall 65. Wherein the plurality of finger extensions 155 are supporting the article 55 in the form of the fishing pole with the reel end portion 56 and the guide tip portion 57 using the primary fishing pole reel end portion holder 335 and the secondary fishing pole guide tip portion holder 340 respectively.

Figure 17:
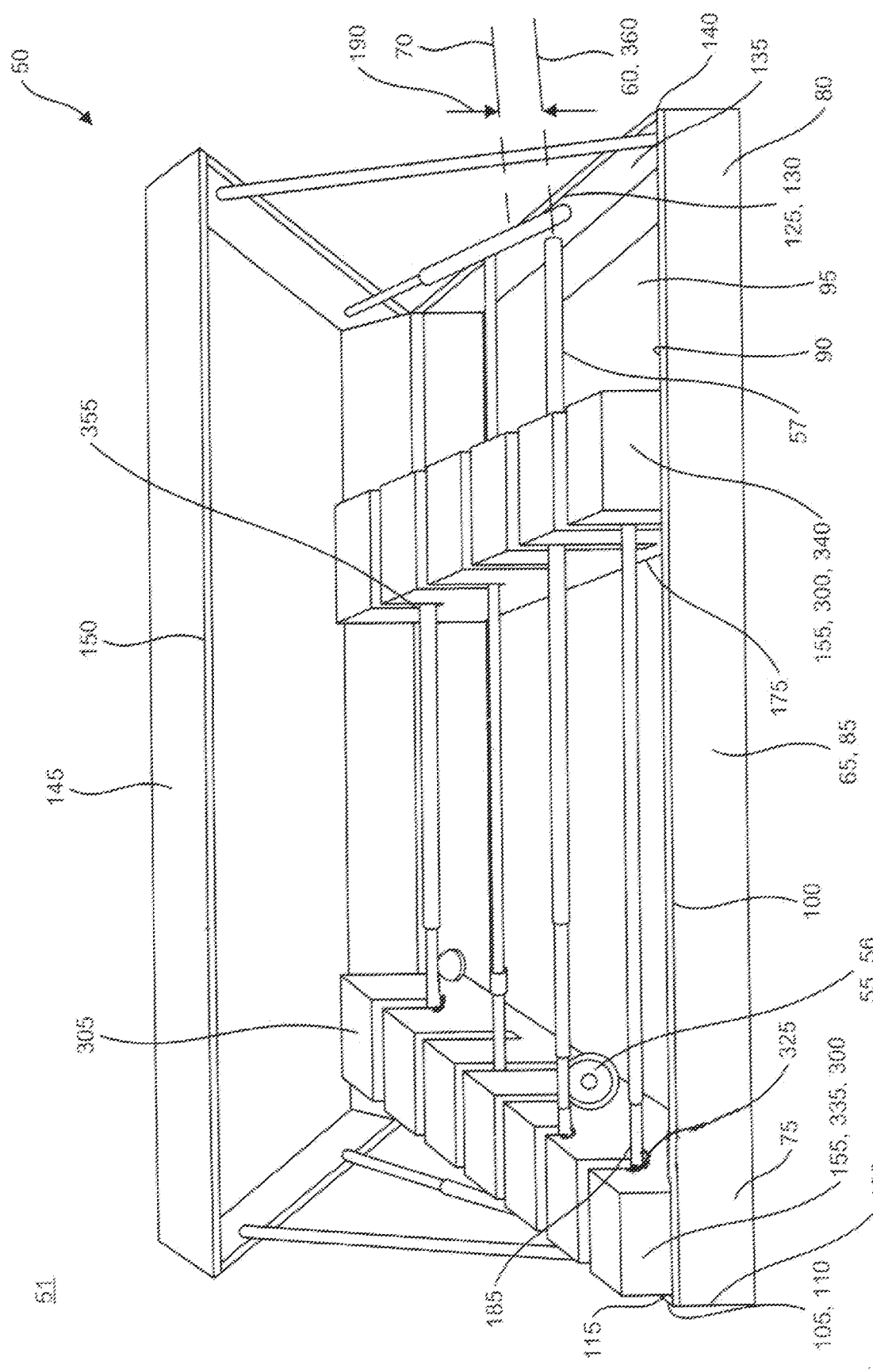
FIG. 17 shows a front upper perspective view of the encasement protective apparatus showing the rigid surrounding sidewall with the head element and the tail element, plus the cover element in an open state over the aperture that shows the plurality of finger extensions disposed within an interior of the rigid surrounding sidewall, wherein the plurality of finger extensions are supporting the article in the form of a fishing pole with the reel end portion and the guide tip portion using the primary fishing pole reel end portion holder and the secondary fishing pole guide tip portion holder respectively.

Further, FIG. 17 shows a front upper perspective view of the encasement protective apparatus 50 showing the rigid surrounding sidewall 65 with the head element 105 and the tail element 125, plus the cover element 145 in an open state over the aperture 100 that shows the plurality of finger extensions 155 disposed within the interior 95 of the rigid surrounding sidewall 65. Wherein the plurality of finger extensions 155 are supporting the article 55 in the form of a fishing pole with the reel end portion 56 and the guide tip portion 57 using the primary fishing pole reel end portion holder 335 and the secondary fishing pole guide tip portion holder 340 respectively.

Figure 18:
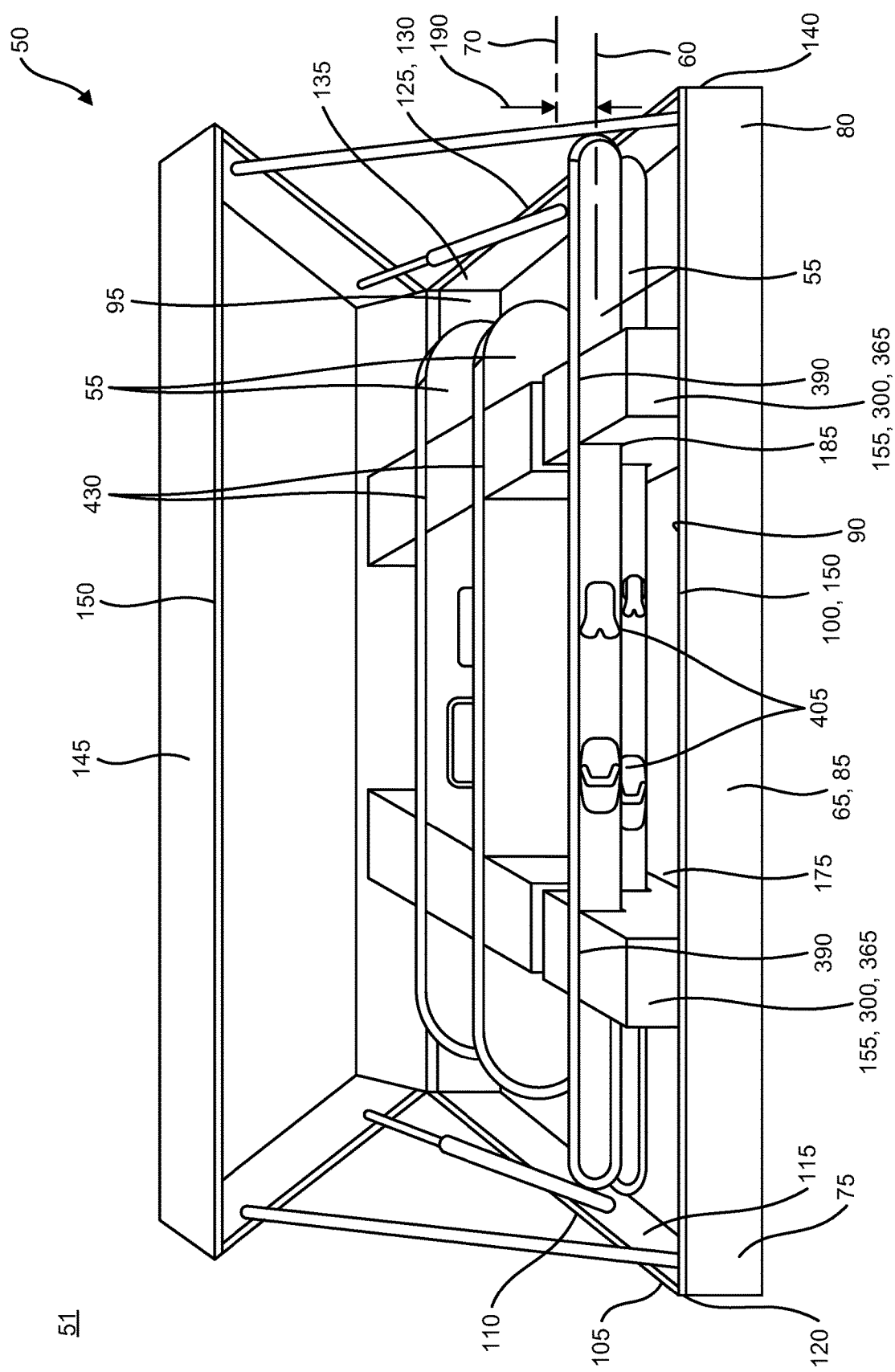
FIG. 18 shows a front upper perspective view of the encasement protective apparatus showing the rigid surrounding sidewall with the head element and the tail element, plus the cover element in an open state over the aperture that shows the plurality of finger extensions disposed within an interior of the rigid surrounding sidewall, wherein the plurality of finger extensions are supporting the article in the form of multiple pairs of skis disposed within the progressively increasing third gap depths of the plurality of finger extensions that facilitates the adjacent ski bindings protrusions to clear one another via a vertical offset from the progressively increasing third gap depths, also shown are snowboards disposed in the fourth gaps of the plurality of finger extensions.

Next, FIG. 18 shows a front upper perspective view of the encasement protective apparatus 50 showing the rigid surrounding sidewall 65 with the head element 105 and the tail element 125, plus the cover element 145 in an open state over the aperture 100 that shows the plurality of finger extensions 155 disposed within the interior 95 of the rigid surrounding sidewall 65. Wherein the plurality of finger extensions 155 are supporting the article 55 in the form of multiple pairs of skis disposed within the progressively increasing 395 third gap 370 depths 375, 400 of the plurality of finger extensions 155 that facilitates the adjacent ski 55 bindings protrusions to clear one another 405 via a vertical offset from the progressively increasing 395 third gap 370 depths 375, 400, also shown are snowboards 55 disposed in the fourth gaps 410 of the plurality of finger extensions 155.

Figure 19:
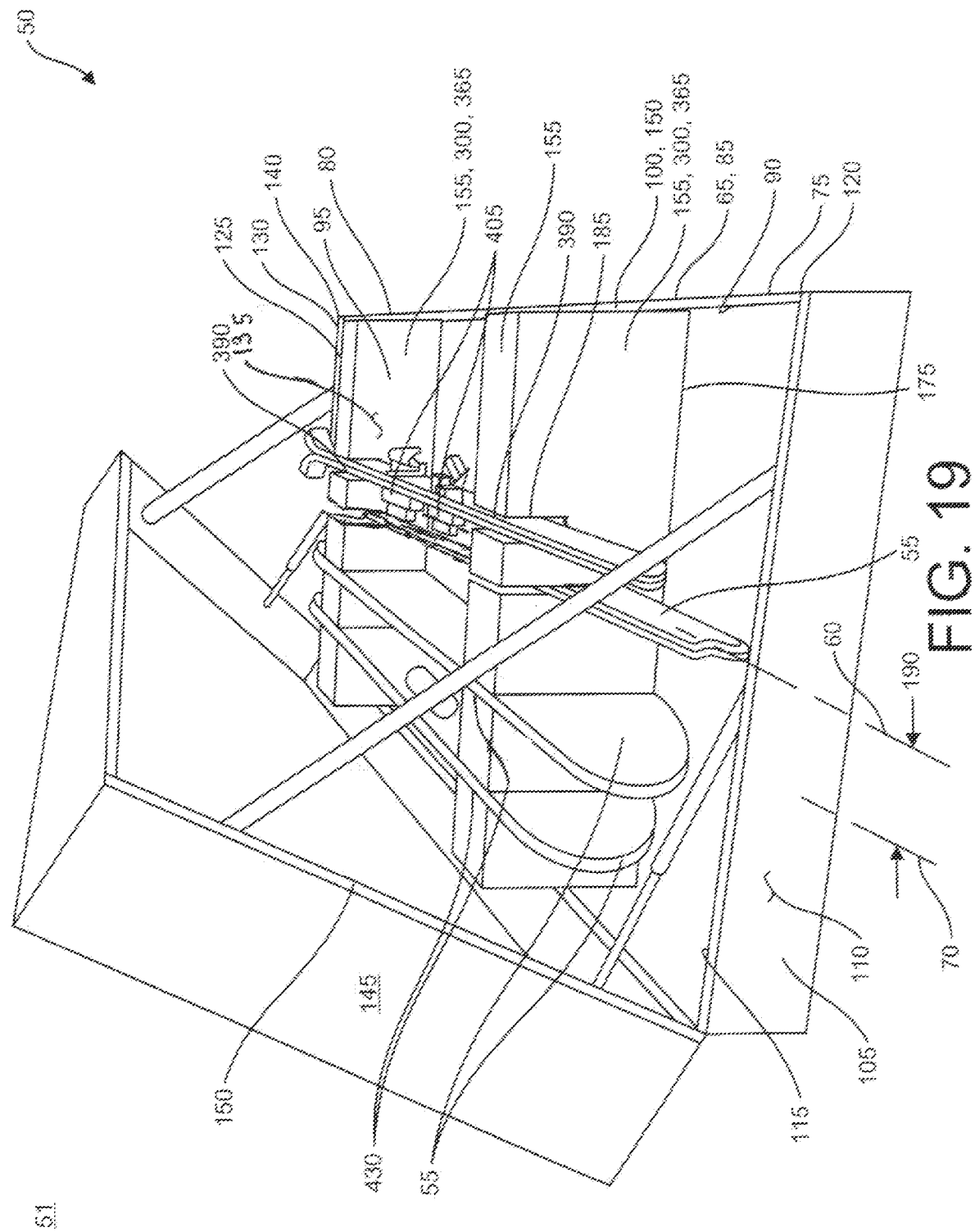
FIG. 19 shows an end upper perspective view of the encasement protective apparatus showing the rigid surrounding sidewall with the head element and the tail element, plus the cover element in an open state over the aperture that shows the plurality of finger extensions disposed within an interior of the rigid surrounding sidewall, wherein the plurality of finger extensions are supporting the article in the form of multiple pairs of skis disposed within the progressively increasing third gap depths of the plurality of finger extensions that facilitates the adjacent ski bindings protrusions to clear one another via a vertical offset from the progressively increasing third gap depths, also shown are snowboards disposed in the fourth gaps of the plurality of finger extensions.

Continuing, FIG. 19 shows an end upper perspective view of the encasement protective apparatus 50 showing the rigid surrounding sidewall 65 with the head element 105 and the tail element 125, plus the cover element 145 in an open state over the aperture 100 that shows the plurality of finger extensions 155 disposed within the interior 95 of the rigid surrounding sidewall 65. Wherein the plurality of finger extensions 155 are supporting the article 55 in the form of multiple pairs of skis 55 disposed within the progressively increasing 395 third gap 370 depths 375, 400 of the plurality of finger extensions 155 that facilitates the adjacent ski 55 bindings protrusions to clear one another 405 via a vertical offset from the progressively increasing 395 third gap 370 depths 375, 400, also shown are snowboards 55 disposed in the fourth gaps 410 of the plurality of finger extensions 155.

Broadly in looking at FIGS. 1 to 19, the present invention is of the encasement protective apparatus 50 for enveloping the article 55, the article 55 having a lengthwise axis 60, the apparatus 50 including the substantially rigid partial surrounding sidewall 65 about a longitudinal axis 70, wherein the partial surrounding sidewall 65 has a first end portion 75 and an opposing second end portion 80 wherein the longitudinal axis 70 spanning therebetween. The surrounding sidewall 65 also having an outer surface portion 85 and an opposing inner surface portion 90, thereby the inner surface portion 90 defining the interior 95, plus the aperture 100 disposed therethrough the partial surrounding sidewall 65 facilitating communication as between the interior 96 and an external environment 51, see in particular FIGS. 2 to 6 and FIGS. 16 to 19.

Further included in the encasement protective apparatus 50 is the head element 105 having an outermost surface 110 and an opposing innermost surface 115 wherein the head element 105 is affixed 120 to the first end portion 75 such that structurally the outer surface portion 85 extends to the outmost surface 110 and the inner surface portion 90 extends to the innermost surface 115, see in particular FIGS. 2 to 6 and FIGS. 16 to 19. Also included in the encasement protective apparatus 50 is the tail element 125 wherein the tail element 125 is positioned opposite of the head element 105 in relation to the surrounding sidewall 65, the tail element 125 having an exterior surface 130 and an internal surface 135, such that the tail element 125 is affixed 140 to the second end portion 80 such that structurally the outer surface portion 85 extends to the exterior surface 130 and the inner surface portion 90 extends to the internal surface 135, again see in particular FIGS. 2 to 6 and FIGS. 17 to 19.

In addition included in the encasement protective apparatus 50 is the removably engageable cover element 145 that has the interface 150 to substantially seal over the aperture 100 to facilitate the interior 95 being substantially isolated from the external environment 51, and the plurality of finger extensions 155 that are substantially parallel 160 to one another, each finger extension 155 having a proximal end portion 165 and an opposing distal end portion 170, each proximal end portion 165 extending 175 from the inner surface portion 90, wherein the plurality of finger extensions 155 form the gap 180 as between one another that removably engages 185 the article 55 such that the article 55 lengthwise axis 60 and the longitudinal axis 70 are substantially parallel 190 to one another, wherein operationally the article 55 is secured within the interior 95 and is protected from the external environment 51 by the encasement protective apparatus 50, see in particular FIGS. 2 to 9 and FIGS. 16 to 19.

As an option for the encasement protective apparatus 50, wherein the partial surrounding sidewall 65 can further comprise a means for removable engagement 195 to the vehicle roof 53, wherein the means for removable engagement 195 to the vehicle roof 53 is affixed to the outer surface portion 85, to operationally facilitate transport of the encasement protective apparatus 50 via the vehicle 52, see FIGS. 10 to 12.

As a further option for the encasement protective apparatus 50, wherein the finger extension 155 is structurally constructed with the core 200 of the substantially rigid material encapsuled with the resilient material 205 to provide a cushion to suspend and substantially secure the article 55, see FIGS. 7 to 9.

Alternatively, for the encasement protective apparatus 50, the plurality of finger extensions 155 can be each structurally constructed of high-density foam rubber, see FIGS. 13 to 19.

A further alternative for the encasement protective apparatus 50, wherein the plurality of finger extensions 155, can be sized and configured 305 to receive the fishing pole 55 reel end portion 56 wherein the gap 180 is the first gap 310 being constructed of the narrow portion 315 disposed on the distal end portion 170 and the first gap 310 has an expanded portion 320 disposed on the proximal end portion 165, wherein the expanded portion 320 is to receive 325 the reel end portion 56 and the narrow portion 315 helps to retain 330 the reel end portion 56 in the expanded portion 320, the plurality of finger extensions 155 with the narrow 315 and expanded portion 320 first gaps 310 form the primary fishing pole reel end portion 56 holder 335, see in particular FIGS. 13, 14, 16, and 17.

A continuing alternative for the encasement protective apparatus 50, wherein the plurality of finger extensions 155 can further comprise a secondary fishing pole guide tip portion holder 340, wherein the secondary fishing pole guide tip portion holder 340 is constructed of the plurality of finger extensions 155 with the second gap 345 that is configured to be a narrow slit 350 to support 355 the fishing pole 55 guide tip portion 57, wherein operationally the partial surrounding sidewall 65 interior 95 contains the primary fishing pole reel end portion holder 335 being disposed in the first end portion 75 and the secondary fishing pole guide tip portion holder 340 being disposed in the second end portion 80 such that the expanded portion 320 and the narrow slit 350 are in-line and co-incident 360 with one another along the article lengthwise axis 60 that is parallel to the longitudinal axis 70, see in particular FIGS. 13, 14, 16, and 17.

A further alternative for the encasement protective apparatus 50, wherein the plurality of finger extensions 155 can be sized and configured to receive the pair of snow skis 55 that are facing one another, wherein the gap 180 is the third gap 370 that extends to an initial third gap 370 depth 375 that goes from the third gap 370 open end 380 to the third gap root 385, wherein operationally the third gap 370 supports the snow skis 55 to be flush 390 with the third gap 370 open end 380, see FIGS. 15, 18, and 19.

A continuing alternative for the encasement protective apparatus 50, wherein the plurality of finger extensions 155 can further comprise the plurality of the third gaps 370, wherein each adjacent third gap 370 has a progressively increasing 395 third gap depth 375, 400, wherein each progression 395 of each adjacent third gap 370 depth 375, 400 increases an amount that is equal to or greater than the initial third gap 370 depth 375, wherein operationally each adjacent progressively increasing 395 third gap 370 depth 375, 400 facilitates a set of ski boot bindings on each of the pair of snow skis 55 to vertically clear 405 an adjacent set of ski boot bindings on each of the pair of snow skis 55 disposed in adjacent third gaps 370 via the progressively increasing 395 third gap 370 depths 375, 400, see in particular FIGS. 15, 18, and 19.

A further alternative for the encasement protective apparatus 50, wherein the plurality of finger extensions 155 can further comprise the fourth gap 410 that has the fourth gap 410 depth 415 that extends from a fourth gap 410 open end 420 to a fourth gap 410 root 425, wherein the fourth gap 410 and the fourth gap 410 depth 415 are sized and configured to support a snowboard 55, wherein operationally the fourth gap 410 supports the snowboard 55 to be flush 430 with the fourth gap 410 open end 420, see in particular FIGS. 15, 18, and 19.

CONCLUSION

Accordingly, the present invention of an encasement protective apparatus 50 has been described with some degree of particularity directed to the embodiments of the present invention. It should be appreciated, though; that the present invention is defined by the following claims construed in light of the prior art so modifications of the changes may be made to the exemplary embodiments of the present invention without departing from the inventive concepts contained therein.

The invention claimed is:

1. An encasement protective apparatus for enveloping an article, the article having a lengthwise axis, said encasement protective apparatus comprising:
    (a) a substantially rigid partial surrounding sidewall about a longitudinal axis, wherein said partial surrounding sidewall has a first end portion and an opposing second end portion wherein said longitudinal axis spanning therebetween, said surrounding sidewall also having an outer surface portion and an opposing inner surface portion, thereby said inner surface portion defining an interior, an aperture disposed therethrough said partial surrounding sidewall facilitating communication as between said interior and an external environment;
    (b) a head element having an outermost surface and an opposing innermost surface wherein said head element is affixed to said first end portion such that structurally said outer surface portion extends to said outermost surface and said inner surface portion extends to said innermost surface;
    (c) a tail element wherein said tail element is positioned opposite of said head element in relation to said surrounding sidewall, said tail element having an exterior surface and an internal surface, such that said tail element is affixed to said second end portion such that structurally said outer surface portion extends to said exterior surface and said inner surface portion extends to said internal surface;
    (d) a removably engageable cover element that has an interface to substantially seal over said aperture to facilitate said interior being substantially isolated from the external environment; and
    (e) a plurality of finger extensions that are substantially parallel to one another, each finger extension having a proximal end portion and an opposing distal end portion, each said proximal end portion extending from said inner surface portion, wherein said plurality of finger extensions form a gap as between one another that removably engages the article such that the article lengthwise axis and said longitudinal axis are substantially parallel to one another, wherein said plurality of finger extensions are each structurally constructed of high-density foam rubber, wherein said plurality of finger extensions are sized and configured to receive a pair of snow skis that are facing one another, wherein said gap is a third gap that extends to an initial third gap depth that goes from a third gap open end to a third gap root, wherein operationally said third gap supports the snow skis to be flush with said third gap open end, wherein operationally the article is secured within said interior and protected from the external environment by said encasement protective apparatus.

2. An encasement protective apparatus according to claim 1 wherein said partial surrounding sidewall further comprises a means for removable engagement to a vehicle roof, wherein said means for removable engagement to the vehicle roof is affixed to said outer surface portion, to operationally facilitate transport of said encasement protective apparatus via the vehicle.

3. An encasement protective apparatus according to claim 1, wherein said plurality of finger extensions are each structurally constructed with a core of a substantially rigid material encapsulated with a resilient material to provide a cushion to suspend and substantially secure the article within said interior of said substantially rigid partial surrounding sidewall.

4. An encasement protective apparatus according to claim 1, wherein said plurality of finger extensions further comprise a plurality of said third gaps, wherein each said adjacent third gap has a progressively increasing third gap depth, wherein each progression of each said adjacent third gap depth increases an amount that is equal to or greater than said initial third gap depth, wherein operationally each said adjacent progressively increasing third gap depth facilitates a set of ski boot bindings on each of the pair of snow skis to clear an adjacent set of ski boot bindings on each of the pair of snow skis disposed in adjacent third gaps via said progressively increasing third gap depths.

5. An encasement protective apparatus according to claim 4, wherein said plurality of finger extensions further comprise a fourth gap that has a fourth gap depth that extends from a fourth gap open end to a fourth gap root, wherein said fourth gap and said fourth gap depth are sized and configured to support a snowboard, wherein operationally said fourth gap supports the snowboard to be flush with said fourth gap open end.

* * * * *